United States Patent [19]

Tsutsui et al.

[11] Patent Number: 5,266,544

[45] Date of Patent: * Nov. 30, 1993

[54] OLEFIN POLYMERIZATION CATALYST AND PROCESS FOR THE POLYMERIZATION OF OLEFINS

[75] Inventors: Toshiyuki Tsutsui; Takashi Ueda, both of Kuga, Japan

[73] Assignee: Mitsui Petrochemical Industries, Ltd., Tokyo, Japan

[*] Notice: The portion of the term of this patent subsequent to Jun. 9, 2009 has been disclaimed.

[21] Appl. No.: 888,641

[22] Filed: May 27, 1992

Related U.S. Application Data

[63] Continuation of Ser. No. 634,696, Dec. 27, 1990, Pat. No. 5,120,696.

[30] Foreign Application Priority Data

| Dec. 29, 1989 | [JP] | Japan | 1-340906 |
| Dec. 29, 1989 | [JP] | Japan | 1-340908 |
| Dec. 29, 1989 | [JP] | Japan | 1-340914 |
| Dec. 29, 1989 | [JP] | Japan | 1-340916 |

[51] Int. Cl.$^5$ ............ C08F 4/685; C08F 4/69; C08F 4/642; C08F 4/653
[52] U.S. Cl. ............ 502/113; 502/108; 502/117; 526/114
[58] Field of Search ............ 502/108, 113, 117

[56] References Cited

U.S. PATENT DOCUMENTS

| 4,295,991 | 10/1981 | Wristers | 502/108 X |
| 4,659,685 | 4/1987 | Coleman, III et al. | 502/113 |
| 4,701,432 | 10/1987 | Welborn | 502/113 |
| 4,990,640 | 2/1991 | Tsutsui et al. | 556/181 |
| 5,104,838 | 4/1992 | Fujita et al. | 502/108 |
| 5,120,696 | 6/1992 | Tsutsui et al. | 502/113 |

FOREIGN PATENT DOCUMENTS 0412750   2/1991   European Pat. Off. .

*Primary Examiner*—Patrick P. Garvin
*Attorney, Agent, or Firm*—Sherman and Shalloway

[57] ABSTRACT

In accordance with the present invention, there are provided olefin polymerization solid catalysts comprising

[A] a solid titanium catalyst component containing titanium, magnesium and halogen as its essential ingredients, said catalyst component having supported thereon

[B] a transition metal compound containing a ligand having a cycloalkadienyl skeleton and, if necessary,

[C] an organoaluminum oxy-compound.

In accordance with the invention, there are also provided olefin polymerization solid catalysts comprising

[i] a solid containing a transition metal compound containing a ligand having a cycloalkadienyl skeleton, said solid having supported thereon

[ii] a titanium catalyst component containing titanium, magnesium and halogen as its essential ingredients and, if necessary,

[iii] an organoaluminum oxy-compound.

20 Claims, 2 Drawing Sheets

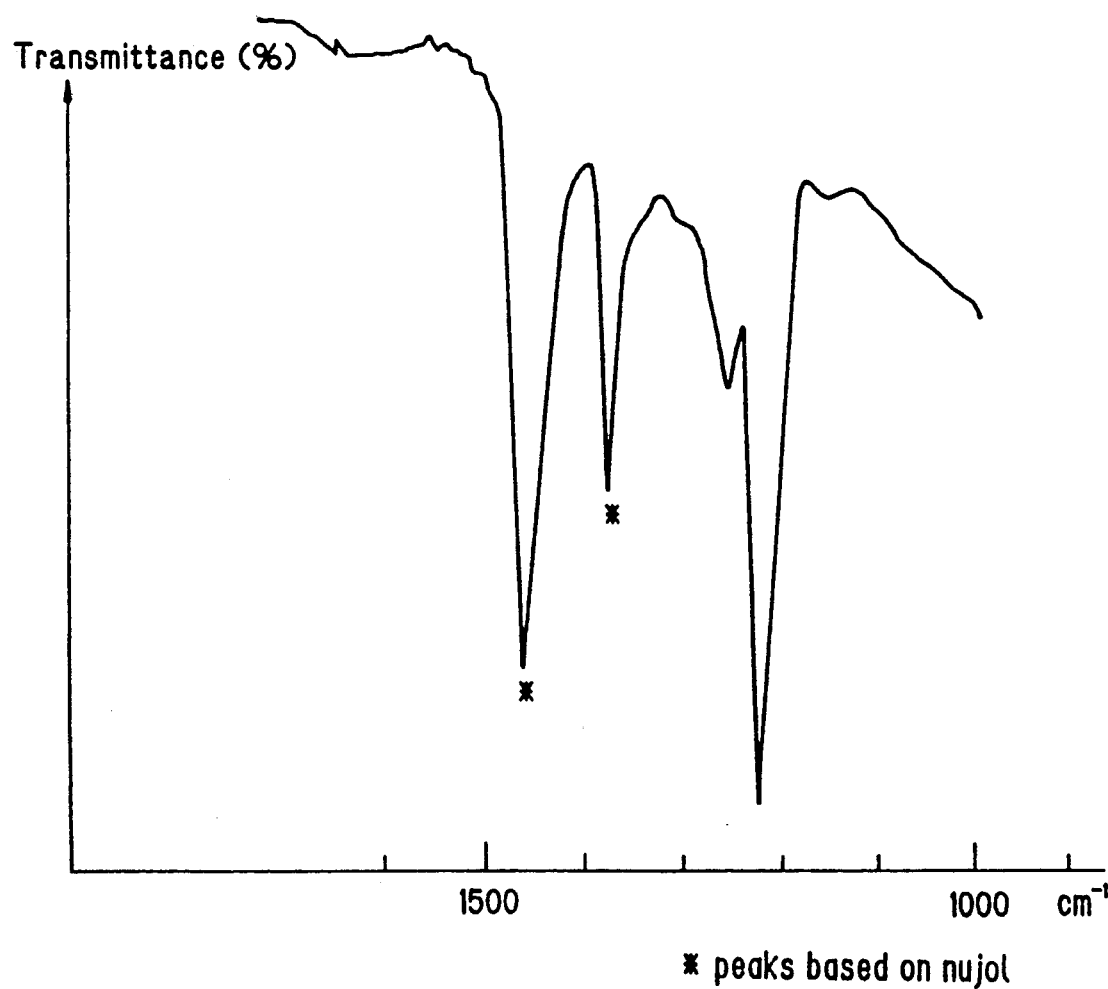

OLEFIN POLYMERIZATION CATALYST AND PROCESS FOR THE POLYMERIZATION OF OLEFINS

This is a continuation of application Ser. No. 07/634,696 filed Dec. 27, 1990, and now U.S. Pat. No. 5,120,696.

FIELD OF THE INVENTION

This invention relates to olefin polymerization catalyst and process for the polymerization of olefins using said catalyst, and more particularly to novel olefin polymerization catalysts having excellent polymerization activities and capable of giving olefin (co)polymers having a broad molecular weight distribution and to a process for the polymerization of olefins using said catalysts.

BACKGROUND OF THE INVENTION

It has heretofore been known that titanium based catalysts composed of a titanium compound and an organoaluminum compound are used as catalysts for the preparation of α-olefin polymers, for example, ethylene polymers or ethylene/α-olefin copolymers.

Generally, olefin polymers obtained with the titanium based catalysts have a broad molecular weight distribution and a broad composition distribution in particular and are poor in surface non-tackiness and transparency.

On the one hand, there have been proposed recently processes for the preparation of ethylene/α-olefin copolymers using catalysts composed of zirconium compounds and aluminoxanes as new type of Ziegler catalysts for olefin polymerization.

Olefin polymers obtained with the above-mentioned new type of Ziegler catalysts for olefin polymerization usually have a narrow molecular weight distribution and a narrow composition distribution. On this account, olefin polymers which have a broad molecular weight distribution according to the purposes for which they are used and which are excellent in moldability have ardently been desired.

Further, it is difficult to obtain olefin polymers having a high molecular weight by polymerization or copolymerization of olefins in the presence of transition metal compound catalysts containing ligands having a cycloalkadienyl skeleton. Accordingly, it has been desired that transition metal compound catalysts containing ligands having a cycloalkadienyl skeleton which are capable of giving olefin polymers having a high molecular weight be developed to make their appearance.

OBJECT OF THE INVENTION

The present invention has been accomplished in light of the prior art as mentioned above, and an object of the invention is to provide olefin polymerization catalysts having excellent polymerization activities and capable of giving olefin (co)polymers which are well balanced between such physical properties as broad molecular weight distribution, excellent moldability and narrow composition distribution, and a process for the polymerization of olefins using said catalysts.

SUMMARY OF THE INVENTION

The first series of olefin polymerization solid catalyst according to the present invention comprises

[A] a solid titanium catalyst component containing titanium, magnesium and halogen as its essential ingredients and supporting thereon

[B] a transition metal compound containing a ligand having a cycloalkadienyl skeleton and, if necessary,

[C] an organoaluminum oxy-compound.

The second series of olefin polymerization solid catalysts according to the invention comprises

[I] a solid catalyst components comprising

[A] a solid titanium catalyst component containing titanium, magnesium and halogen as its essential ingredients and supporting thereon

[B] a transition metal compound containing a ligand having a cycloalkadienyl skeleton and, if necessary,

[C] an organoaluminum oxy-compound,

[II] an organoaluminum oxy-compound and/or

[III] an organoaluminum compound.

The third series of olefin polymerization solid catalysts according to the invention comprises

[i] a solid containing a transition metal compound containing a ligand having a cycloalkadienyl skeleton and supporting thereon

[ii] a titanium catalyst component containing titanium, magnesium and halogen as its essential ingredient and, if necessary,

[iii] an organoaluminum oxy-compound.

The fourth series of olefin polymerization solid catalysts according to the invention comprises (I) a solid catalyst component comprising

[i] a solid containing a transition metal compound containing a ligand having a cycloalkadienyl skeleton and supporting thereon

[ii] a titanium catalyst component containing titanium, magnesium and halogen as its essential ingredient and, if necessary,

[iii] an organoaluminum oxy-compound.

(II) an organoaluminum oxy-compound and/or (III) an organoaluminum compound.

The olefin polymerization catalysts according to the present invention as illustrated above may be prepolymerized with olefins.

Further, the process for the polymerization of olefins according to the invention comprises polymerizing or copolymerizing olefins in the presence of the above-mentioned olefin polymerization catalysts.

The olefin polymerization catalyst components of the invention have excellent polymerization activities and are capable of giving high molecular weight olefin polymers having a broad molecular weight distribution and excellent moldability.

BRIEF DESCRIPTION OF THE DRAWINGS

FIG. 2 is a graph showing IR spectrum of a known benzene-soluble organoaluminum oxy-compound.

DETAILED DESCRIPTION OF THE INVENTION

Figure 1:
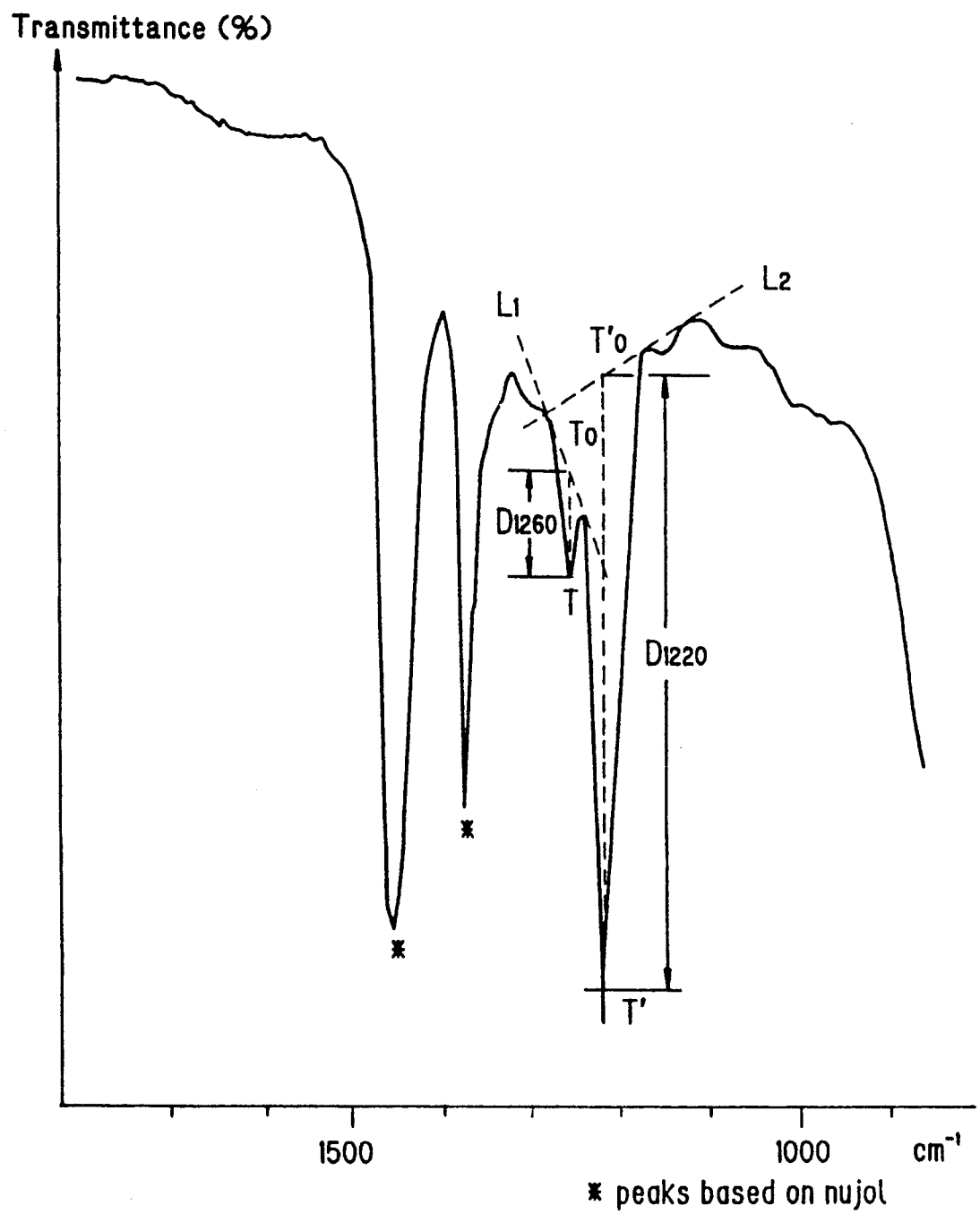
FIG. 1 is a graph showing IR spectrum of a benzene-insoluble organoaluminum oxy-compound used in the present invention.

The olefin polymerization catalysts of the present invention and the process for the polymerization of olefins using said olefin polymerization catalysts are illustrated below in detail.

In the present invention, the term "polymerization" is sometimes used in a sense that it includes not only homopolymerization but also copolymerization, and also the term "polymer" is sometimes used in a sense that it includes not only homopolymer but also copolymer.

The first series of olefin polymerization solid catalyst according to the invention comprises

[A] a solid titanium catalyst component containing titanium, magnesium and halogen as its essential ingredients and supporting thereon

[B] a transition metal compound containing a ligand having a cycloalkadienyl skeleton and, if necessary,

[C] an organoaluminum oxy-compound.

First, the solid titanium catalyst component as mentioned in [A] above is illustrated. This solid titanium catalyst component [A] contains titanium, magnesium and halogen as its essential ingredients, and it further contains, if necessary, an electron donor.

The above-mentioned solid titanium catalyst component [A] may be prepared by bringing a magnesium compound, a titanium compound and, if necessary, an electron donor into contact with one another.

Titanium compound useful for the preparation of the solid titanium catalyst component [A] includes tetravalent titanium compounds usually represented by the formula $Ti(OR)_g X_{4-g}$ (wherein R is a hydrocarbon group, X is halogen, and $0 \leq g \leq 4$). More particularly, these titanium compounds include titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(O\ n\text{-}C_4H_9)Cl_3$, $Ti(O\ iso\text{-}C_4H_9)Cl_3$, $Ti(OC_2H_5)Br_3$, and $Ti(O\ iso\text{-}C_4H_9)Br_3$; alkoxytitanium dihalides such as $Ti(OCH_3)_2Cl_2$, $Ti(OC_2H_5)_2Cl_2$, $Ti(O\ n\text{-}C_4H_9)_2Cl_2$, and $Ti(OC_2H_5)_2Br_2$; trialkoxytitanium monohalides such as $Ti(OCH_3)_3Cl$, $Ti(OC_2H_5)_3Cl$, $Ti(O\ n\text{-}C_4H_9)_3Cl$ and $Ti(OC_2H_5)_3Br$; and tetraalkoxytitanium such as $Ti(OCH_3)_4$, $Ti(OC_2H_5)_4$, $Ti(O\ n\text{-}C_4H_9)_4$, $Ti(O\ iso\text{-}C_4H_9)_4$ and $Ti(O\ 2\text{-ethylhexyl})_4$.

Of the useful titanium compounds as exemplified above, preferred are halogen containing titanium compounds, in particular, titanium tetrahalides and especially titanium tetrachloride. These titanium compounds may be used either singly or in admixture of two or more, and also they may be diluted, before use, with hydrocarbon compounds or halogenated hydrocarbon compounds.

Further trivalent titanium compounds such as $TiCl_3$ may be used.

Magnesium compounds useful for the preparation of the solid titanium catalyst component [A] in the present invention include those having reducing ability and those having no reducing ability.

The magnesium compounds having reducing ability as referred to herein include, for example, those having a magnesium-carbon bond or magnesium-hydrogen bond. Concrete examples of such magnesium compounds as having reducing ability include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butyl ethoxy magnesium, ethyl butyl magnesium, octyl butyl magnesium, butylmagnesium halide, etc. The magnesium compounds exemplified above may be used singly, or may form complex compounds with organoaluminum compounds as will be mentioned later, and they also may be either liquid or solid.

Concrete examples of magnesium compounds having no reducing ability include halogenated magnesium such as magnesium chloride, magnesium bromide, magnesium iodide or magnesium fluoride; alkoxy magnesium halide such as methoxy magnesium chloride, ethoxy magnesium chloride, isopropoxy magnesium chloride, butoxy magnesium chloride or octoxy magnesium chloride; aryloxy magnesium halide such as phenoxy magnesium chloride or methylphenoxy magnesium halide; alkoxy magnesium such as ethoxy magnesium, isopropoxy magnesium, butoxy magnesium, n-octoxy magnesium or 2-ethylhexoxy magnesium; aryloxy magnesium such as phenoxy magnesium or dimethylphenoxy magnesium; and magnesium carboxylate such as magnesium laurate or magnesium stearate.

The magnesium compounds having no reducing ability exemplified above may be compounds derived from the above-mentioned magnesium compounds having reducing ability or compound derived at the time of preparation of catalyst component. The magnesium compound having no reducing ability may be derived from the magnesium compounds having reducing ability, for example, by bringing said magnesium compounds having reducing ability into contact with polysiloxane compounds, halogen containing silane compounds, halogen containing aluminum compounds or compounds such as esters, alcohols, etc.

The magnesium compounds used in the present invention may also be complex or composite compounds of the above-mentioned magnesium compounds with other metals, or mixtures thereof. Further, the magnesium compounds used herein may also be mixtures of two or more of these compounds mentioned above.

Of these magnesium compounds exemplified above, preferred are those having no reducing ability, particularly halogen containing magnesium compounds. Of the halogen containing magnesium compounds, preferred are magnesium chloride, alkoxy magnesium halide and aryloxy magnesium halide.

In preparing the solid titanium catalyst component [A], it is preferable to use an electron donor. Useful electron donors include alcohols, amines, amides, ethers, ketones, esters, nitriles, phosphines, stibines, arsines, phosphoramides, thioethers, thioesters, acid anhydrides, acid halides aldehydes, alcoholates, alkoxy(aryloxy)silanes and organic acids. Of these electron donors exemplified above, preferred are alcohols, amines, ethers, esters, acid anhydrides, alkoxy(aryloxy)-silanes and organic acids.

The solid titanium catalyst component [A] may be prepared by bringing the above-mentioned magnesium compound (or metallic magnesium), titanium compound and, if necessary, electron donor into contact with one another. In preparing the solid titanium catalyst components, there may be employed the known method for the preparation of highly active titanium catalyst components from magnesium compounds, titanium compounds and, if necessary, electron donors. The above-mentioned components may be brought into contact with one another in the presence of other reaction reagents, for example, silicon, phosphorus and aluminum.

Briefly illustrated below are several examples of the process for the preparation of these solid titanium catalyst components.

In the following processes for the preparation of the solid titanium catalyst component [A] as will be illustrated below, the electron donor is used, but the use of the electron donor is not always necessary.

(1) A process wherein a magnesium compound or a complex compound comprising the magnesium compound and electron donor is allowed to react with the titanium compound in the liquid phase. In carrying out this reaction, each reactant may be pretreated with a reaction assistant such as the electron donor and/or an organoaluminum compound or a halogen containing silicon compound. In this process, the above-mentioned electron donor is used at least one time.

(2) A process wherein a liquid magnesium compound having no reducing ability is allowed to react with a liquid titanium compound in the presence of an electron donor, thereby separating out a solid magnesium titanium composite.

(3) A process wherein the reaction product obtained in the process (2) is allowed to react further with a titanium compound.

(4) A process wherein the reaction product obtained in the process (1) or (2) is allowed to react further with an electron donor and a titanium compound.

(5) A process wherein a solid product obtained by pulverizing a magnesium compound or a complex compound comprising a magnesium compound and an electron donor in the presence of a titanium compound is treated with any of halogen, a halogen compound and an aromatic hydrocarbon. In carrying out this process, the magnesium compound or the complex compound comprising the magnesium compound and the electron donor may be pulverized in the presence of a pulverized assistant. Further, after pulverizing the magnesium compound or the complex compound comprising the magnesium compound and the electron donor in the presence of the titanium compound, the solid product obtained thereby is pretreated with a reaction assistant, followed by treatment with halogen or the like. The reaction assistant used herein includes an organoaluminum compound or a halogen containing silicon compound. In this process, the electron donor is used at least one time.

(6) A process wherein the compound obtained in the processes (1)-(4) is treated with halogen, a halogen compound or an aromatic hydrocarbon.

(7) A process wherein a contact reaction product of a metallic oxide with dihydrocarbyl magnesium and a halogen containing alcohol is brought into contact with an electron donor and a titanium compound.

(8) A process wherein a magnesium compound such as magnesium salt of an organic acid, alkoxy magnesium or aryloxy magnesium is allowed to react with an electron donor, a titanium compound and/or a halogen containing hydrocarbon.

(9) A process wherein a catalyst component contained in a hydrocarbon solution at least comprising a magnesium compound, alkoxy titanium and/or an electron donor such as alcohol or ether are allowed to react with a titanium compound and/or a halogen containing compound such as a halogen containing silicon compound.

(10) A process wherein a liquid magnesium compound having no reducing ability is allowed to react with an organoaluminum compound to separate a solid magnesium aluminum composite, followed by reaction with a titanium compound.

Of the above-mentioned processes (1) to (10) for the preparation of the titanium catalyst component [A], preferred are the processes (1) to (4) and (10).

The amount of each of the above-mentioned components used in the preparation of the solid titanium catalyst component [A] cannot be indiscriminately defined, because it varies according to the process employed. For example, however, there may be used, based on 1 mole of the magnesium compound, the electron donor in an amount of about 0.01–20 moles, preferably 0.05–10 moles, and the titanium compound in an amount of about 0.01–500 moles, preferably 0.05–300 moles.

The solid titanium catalyst component thus obtained contains magnesium, titanium, halogen and, if necessary, an electron donor, as its essential ingredients.

In the solid titanium catalyst component [A], Halogen/Ti (atomic ratio) is about 4–200, preferably 5–100, the above-mentioned electron donor/Ti (molar ratio) is about 0.1–50, preferably about 0.2–25, and Mg/Ti (atomic ratio) is about 1–100, preferably about 2–50.

In comparison with commercially available halogenated magnesium, the solid titanium catalyst component [A], contains halogenated magnesium having small crystal size whose specific surface area is usually larger than about 10 m$^2$/g, preferably about 30–1000 m$^2$/g and especially about 50–800 m$^2$/g. This solid titanium catalyst component [A] does not substantially change in composition when it is washed with hexane, because the above-mentioned components used in said titanium catalyst component [A] are integrated into an integrated catalyst component.

The processes for the preparation of such highly active titanium catalyst components [A] as mentioned above are disclosed, for example, in Japanese Patent L-O-P Publns. Nos. 108385/1975, 126590/1975, 20297/1976, 28189/1976, 64586/1976, 2885/1976, 136625/1976, 87489/1977, 100596/1977, 147688/1977, 104593/1977, 2580/1978, 40093/1978, 40094/1978, 43094/1978, 135102/1980, 135103/1980, 152710/1980, 811/1981, 11908/1981, 18606/1981, 83006/1983, 138705/1983, 138706/1983, 138707/1983, 138708/1983, 138709/1983, 138710/1983, 138715/1983, 23404/1985, 195108/1985, 21109/1986, 37802/1986 and 37803/1986.

The transition metal compound [B] containing a ligand having a cycloalkadienyl skeleton used in the present invention is represented by the formula $ML_x$ wherein M is a transition metal, L is a ligand coordinating to the transition metal, at least one of L is a ligand having a cycloalkadienyl skeleton, and when at least two or more ligands having a cycloalkadienyl skeleton are contained, at least two ligands having a cycloalkadienyl skeleton may be linked together via lower alkylene, substituted alkylene, silylene or substituted silylene, L other than the ligand having a cycloalkadienyl skeleton is hydrocarbon group of 1–12 carbon atoms, alkoxy of 1–12 carbon atoms, aryloxy, halogen or hydrogen, and x is a valence of the transition metal.

In the above-mentioned formula, M which is a transition metal includes zirconium, titanium, hafnium, chromium or vanadium by preference, and particularly preferred are zirconium and hafnium.

The ligands having a cycloalkadienyl skeleton include, for example, cyclopentadienyl, alkyl-substituted cyclopentadienyl such as methylcyclopentadienyl, ethylcyclopentadienyl, n-butylcyclopentadienyl, dimethylcyclopentadienyl and pentamethylcyclopentadienyl, and indenyl and fluorenyl.

Two or more ligands having a cycloalkadienyl skeleton as mentioned above may coordinate to the transition metal and, in this case, at least two ligands having a cycloalkadienyl skeleton may be linked together via alkylene, substituted alkylene, silylene or substituted silylene. The alkylene group includes methylene, ethylene and propylene, the substituted alkylene includes isopropylidene, etc., and the substituted silylene includes dimethylsilylene and diphenylsilylene.

The ligand other than those having a cycloalkadienyl skeleton is a hydrocarbon group of 1-12 carbon atoms, an alkoxy group, an aryloxy group, halogen or hydrogen.

The hydrocarbon group having 1-12 carbon atoms mentioned above includes, for example, alkyl, cycloalkyl, aryl and aralkyl, and the alkyl group includes methyl, ethyl, propyl, isopropyl and butyl.

The cycloalkyl group mentioned above includes, for example, cyclopentyl and cyclohexyl, the aryl group includes, for example, phenyl and tolyl, and the aralkyl group includes, for example, benzyl and neophyl.

The alkoxy group mentioned above includes, for example, methoxy, ethoxy and butoxy, and the aryloxy group includes, for example, phenoxy.

The halogen mentioned above includes, for example, fluorine, chlorine, bromine and iodine.

Listed below are typical representatives of the transition metal compounds having a cycloalkadienyl skeleton, represented by the aforementioned formula $ML_x$ in which M is zirconium.

Bis(cyclopentadienyl)zirconium monochloride monohydride,
Bis(cyclopentadienyl)zirconium monobromide monohydride,
Bis(cyclopentadienyl)methyl zirconium hydride,
Bis(cyclopentadienyl)ethyl zirconium hydride,
Bis(cyclopentadienyl)phenyl zirconium hydride,
Bis(cyclopentadienyl)benzyl zirconium hydride,
Bis(cyclopentadienyl)neopentyl zirconium hydride,
Bis(methylcyclopentadienyl)zirconium monochloride hydride,
Bis(indenyl)zirconium monochloride monohydride,
Bis(cyclopentadienyl)zirconium dichloride,
Bis(cyclopentadienyl)zirconium dibromide,
Bis(cyclopentadienyl)methyl zirconium monochloride,
Bis(cyclopentadienyl)ethyl zirconium monochloride,
Bis(cyclopentadienyl)cyclohexyl zirconium monochloride,
Bis(cyclopentadienyl)phenyl zirconium monochloride,
Bis(cyclopentadienyl)benzyl zirconium monochloride,
Bis(methylcyclopentadienyl)zirconium dichloride,
Bis(n-butylcyclopentadienyl)zirconium dichloride,
Bis(indenyl)zirconium dichloride,
Bis(indenyl)zirconium dibromide,
Bis(cyclopentadienyl)zirconium dimethyl,
Bis(cyclopentadienyl)zirconium diphenyl,
Bis(cyclopentadienyl)zirconium dibenzyl,
Bis(cyclopentadienyl)zirconium methoxychloride,
Bis(cyclopentadienyl)zirconium ethoxychloride,
Bis(methylcyclopentadienyl)zirconium ethoxychloride,
Bis(cyclopentadienyl)zirconium phenoxychloride,
Bis(fluorenyl)zirconium dichloride,
Ethylenebis(indenyl)dimethyl zirconium,
Ethylenebis(indenyl)diethyl zirconium,
Ethylenebis(indenyl)diphenyl zirconium,
Ethylenebis(indenyl)methyl zirconium monochloride,
Ethylenebis(indenyl)ethyl zirconium monochloride,
Ethylenebis(indenyl)methyl zirconium monobromide,
Ethylenebis(indenyl)zirconium dichloride,
Ethylenebis(indenyl)zirconium dibromide,
Ethylenebis(4,5,6,7-tetrahydro-1-indenyl)dimethyl zirconium,
Ethylenebis(4,5,6,7-tetrahydro-1-indenyl)methyl zirconium monochloride,
Ethylenebis(4,5,6,7-tetrahydro-1-indenyl)zirconium dichloride,
Ethylenebis(4,5,6,7-tetrahydro-1-indenyl)zirconium dibromide,
Ethylenebis(4-methyl-1-indenyl)zirconium dichloride,
Ethylenebis(5-methyl-1-indenyl)zirconium dichloride,
Ethylenebis(6-methyl-1-indenyl)zirconium dichloride,
Ethylenebis(7-methyl-1-indenyl)zirconium dichloride,
Ethylenebis(5-methoxy-1-indenyl)zirconium dichloride,
Ethylenebis(2,3-dimethyl-1-indenyl)zirconium dichloride,
Ethylenebis(4,7-dimethyl-1-indenyl)zirconium dichloride,
Ethylenebis(4,7-dimethoxy-1-indenyl)zirconium dichloride,
Dimethylsilylenenbis(cyclopentadienyl)zirconium dichloride,
Dimethylsilylenebis(indenyl)zirconium dichloride,
Dimethylsilylenebis(methylcyclopentadienyl)zirconium dichloride,
Isopropylidenebis(indenyl)zirconium dichloride,
Isopropylidene(cyclopentadienyl-fluorenyl)zirconium dichloride, There may also be used transition metal compounds obtained by replacing the zirconium metal in the above-exemplified zirconium compounds with titanium metal, hafnium metal, or vanadium metal.

The organoaluminum oxy-compound [C] supported on the solid titanium catalyst component [A], if necessary, in the present invention may be known aluminoxane or a benzene-insoluble organoaluminum oxy-compound first discovered by the present inventors.

The above-mentioned aluminoxane may be prepared, for example, by the following procedures.

(1) The procedure for recovering aluminoxanes as their solution in hydrocarbons which comprises reacting organoaluminum compounds such as trialkylaluminum with suspensions in hydrocarbon solvents of compounds having absorbed water or salts containing water of crystallization, for example, hydrates of magnesium chloride, copper sulfate, aluminum sulfate, nickel sulfate or cerous chloride.

(2) The procedure for recovering aluminoxanes as their solution in hydrocarbons which comprises allowing organoaluminum compounds such as trialkylaluminum to interact directly with water, ice or water vapor in solvents such as benzene, toluene, ethyl ether and tetrahydrofuran.

In this connection, the above-mentioned solution of aluminoxane may contain small amount of organometallic components. Furthermore, the solution of aluminoxane recovered by the above-mentioned procedures may be distilled to remove therefrom the solvent or unreacted organoaluminum compound, followed by dissolving again in solvents.

The organoaluminum compounds used for preparing such solutions of aluminoxane as mentioned above include, for example, trialkylaluminum such as trimethylaluminum, triethylaluminum, tripropylaluminum, triisopropylaluminum, tri-n-butylaluminum, triisobutylaluminum, tri-secbutylaluminum, tri-tert-butylaluminum, tripentylaluminum, trihexylaluminum, trioctylaluminum, tridecylaluminum, tricyclohexylaluminum, tricyclooctylaluminum; dialkylaluminum halides such as dimethylaluminum chloride, diethylaluminum chloride, diethylaluminum bromide and diisobutylaluminum chloride; dialkylaluminum hydrides such as diethylaluminum hydride and diisobutylaluminum hydride; dialkylaluminum alkoxides such as dimethylaluminum methoxide and diethylaluminum ethoxide; and dialkylaluminum aryloxides such as diethylaluminum phenoxide.

Of the organoaluminum compounds as exemplified above, particularly preferred is trialkylaluminum.

Furthermore, there may also be used as the organoaluminum compound isoprenylaluminum represented by the general formula

wherein x, y and z are each a positive number, and $z \geq 2x$.

The organoaluminum compounds mentioned above may be used either singly or in combination.

Solvents used in the solutions of aluminoxane include aromatic hydrocarbons such as benzene, toluene, xylene, cumene and cymeme; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; or halides, particularly chloride and bromides, of the above-mentioned aromatic, aliphatic and alicyclic hydrocarbons. In addition thereto, there may also be used ethers such as ethyl ether and tetrahydrofuran. Of these solvents as exemplified above, particularly preferred are aromatic hydrocarbons.

The benzene-insoluble organoaluminum oxy-compounds of the present invention contain Al component which dissolves in benzene at 60° C. in an amount of less than 10%, preferably less than 5% and further desirably less than 2% in terms of Al atom, and they are insoluble or sparingly soluble in benzene.

Solubility in benzene of such organoaluminum oxy-compounds as mentioned above is obtained by suspending in 100 ml of benzene said organoaluminum oxy-compound in an amount corresponding to 100 mg atoms in terms of Al atom, mixing the resulting suspension at 60° C. for 6 hours, filtering the resulting mixture with G-5 glass filter equipped with a jacket kept at 60° C., and washing four times the solids portion separated on the filter with 50 ml of benzene at 60° C. to measure the amount (x mmol) of Al atoms present in the whole filtrate.

When the benzene-insoluble organoaluminum oxy-compounds of the present invention are analyzed by infrared spectrophotometry (IR), a ratio ($D_{1260}/D_{1220}$) of an absorbance ($D_{1260}$) at around 1260 cm$^{-1}$ to an absorbance ($D_{1220}$) at around 1220 cm$^{-1}$ is less than 0.09, preferably less than 0.08 and particularly in the range of from 0.04 to 0.07.

Infrared spectrophotometric analysis of the organoaluminum oxy-compounds as referred to in the present specification is carried out in the following manner.

First, the organoaluminum oxy-compound is ground, together with nujol, in an agate mortar in a nitrogen box to paste.

Next, the paste-like sample thus obtained is put between KBr plates, and IR spectrum is measured in a nitrogen atmosphere by means of IR-810 manufactured and sold by Nippon Bunko K.K.

IR spectrum of the organoaluminum oxy-compound of the present invention as obtained is shown in FIG. 1.

From the thus obtained IR spectrum, a $D_{1260}/D_{1220}$ ratio is sought, and a value of said ratio is obtained in the following manner.

(a) A line connecting a maximum point at around 1280 cm$^{-1}$ and a maximum point at around 1240 cm$^{-1}$ is taken as a base line $L_1$.

(b) A transmittance (T %) at an absorption minimum point at around 1260 cm$^{-1}$ and an transmittance ($T_0$ %) at a point of intersection are read, said point of intersection being obtained by drawing a vertical line from said absorption minimum point to a wave number abscissa axis (abscissa) and crossing said vertical line with said base line $L_1$, whereby an absorbance ($D_{1260} = \log T_0/T$) is calculated.

(c) Similarly, a line connecting maximum points at around 1280 cm$^{-1}$ and at around 1180 cm$^{-1}$ is taken as a base line $L_2$.

(d) A transmittance (T' %) at an absorption minimum point at around 1220 cm$^{-1}$ and a transmittance ($T'_0$ %) at a point of intersection are read, said point of intersection being obtained by drawing a vertical line from said absorption minimum point to a wave number abscissa axis (abscissa) and crossing said vertical line with said base line $L_2$, whereby an absorbance ($D_{1220} = \log T'_0/T'$) is calculated.

(e) From these values as obtained, $D_{1260}/D_{1220}$ is calculated.

IR spectrum of a known benzene-soluble organoaluminum oxy-compound is shown in FIG. 2. As can be seen from FIG. 2, the benzene-soluble aluminum oxy-compound has a value of $D_{1260}/D_{1220}$ of being virtually 0.10-0.13, and thus the benzeneinsoluble organoaluminum oxy-compound of the present invention is apparently different in the value of $D_{1260}/D_{1220}$ from the known benzene-soluble organoaluminum oxy-compound.

The benzene-insoluble organoaluminum oxy-compounds of the present invention are presumed to have an alkyloxyaluminum unit represented by the formula

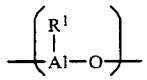

wherein $R^1$ is a hydrocarbon group of 1 to 12 carbon atoms.

In the above-mentioned alkyloxyaluminum unit, $R^1$ includes, for example, methyl, ethyl, n-propyl, isopropyl, n-butyl, isobutyl, pentyl, hexyl, octyl, decyl, cyclohexyl and cyclooctyl. Of these hydrocarbon groups exemplified above, preferred are methyl and ethyl, and particularly preferred is methyl.

In addition to the alkyloxyaluminum unit of the formula

the benzene-insoluble organoaluminum oxy-compounds of the present invention may contain an oxyaluminum unit represented by the formula

wherein $R^1$ is as defined above, and $R^2$ is a hydrocarbon group of 1 to 12 carbon atoms, an alkoxyl group of 1 to 12 carbon atoms, an aryloxy group of 6 to 20 carbon atoms, a hydroxyl group, halogen or hydrogen, provided that $R^1$ and $R^2$ are different from each other. In that case, the organoaluminum oxy-compounds desirably contain the alkyloxyaluminum unit

in a proportion of at least 30 mol %, preferably at least 50 mol % and particularly at least 70 mol %.

The processes for preparing the benzene-insoluble organoaluminum oxy-compounds of the present invention are illustrated below in detail.

The benzene-insoluble organoaluminum oxy-compounds is obtained by bringing a solution of aluminoxane into contact with water or active hydrogen Containing compounds.

The active hydrogen containing compounds used in the present invention include alcohols such as methanol, ethanol, n-propanol and isopropanol; diols such as ethylene glycol and hydroquinone; and organic acids such as acetic acid and propionic acid. Of these compounds, preferred are alcohols and diols, and especially preferred are alcohols.

Water or the active hydrogen containing compounds with which the solution of aluminoxane is brought into contact may be used as solutions or dispersions in hydrocarbon solvents such as benzene, toluene and hexane, ether solvents such as tetrahydrofuran or amine solvents such as triethylamine, or may be used in the form of vapor or solid. The water with which the solution of aluminoxane is brought into contact may be water of crystallization of salts such as magnesium chloride, magnesium chloride, magnesium sulfate, copper sulfate, nickel sulfate, iron sulfate and cerous chloride, or absorbed water absorbed to inorganic compounds such as silica, alumina and aluminum hydroxide or polymers.

Reaction of the solution of aluminoxane with water or the active hydrogen containing compounds is carried out usually in solvents, for example, hydrocarbon solvents. The solvents used in this case are aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclohexane; petroleum fractions such as gasoline, kerosene and gas oil; halogenated hydrocarbons such as halides of the above-mentioned aromatic hydrocarbons, aliphatic hydrocarbons and alicyclic hydrocarbons, particularly, chlorides and bromides; and ethers such as ethyl ether and tetrahydrofuran. Of these solvents as exemplified above, particularly preferred are aromatic hydrocarbons.

In the reaction as mentioned above, water or the active hydrogen containing compound is used in an amount of 0.1–5 moles, preferably 0.2–3 moles to 1 mole of Al atoms present in the solution of aluminoxane. A concentration in terms of aluminum atom in the reaction system is desirably $1 \times 10^{-3}$–5 gram atom/l, preferably $1 \times 10^{-2}$–3 gram atom/l, and a concentration of water in the reaction system is desirably $2 \times 10^{-4}$–5 mol/l, preferably $2 \times 10^{-3}$–3 mol/l.

The solution of aluminoxane may be brought into contact with water or the active hydrogen containing compound, for example, by the following procedures.

(1) The procedure which comprises bringing the solution of aluminoxane into contact with a hydrocarbon solvent containing water or the active hydrogen containing compound.

(2) The procedure which comprises blowing vapor of water or the active hydrogen containing compound into the solution of aluminoxane, thereby bringing the aluminoxane into contact with the vapor.

(3) The procedure which comprises bringing the solution of aluminoxane into contact directly with water, ice or the active hydrogen containing compound.

(4) The procedure which comprises mixing the solution of aluminoxane with a suspension of an absorbed water containing compound or a water of crystallization containing compound in hydrocarbon, or with a suspension of a compound, to which the active hydrogen containing compound has been absorbed, in hydrocarbon, thereby bringing the aluminoxane into contact with the absorbed water or water of crystallization.

The solution of aluminoxane may contain other components so long as they do not exert adverse effects on the reaction of aluminoxane with water or the active hydrogen containing compound.

The above-mentioned reaction of the solution of aluminoxane with water or the active hydrogen containing compound is carried out usually at $-50°$ to $150°$ C., preferably $0°$–$120°$ C. and more desirably at $20°$–$100°$ C. The reaction time employed is usually 0.5–300 hours, preferably 1–150 hours, though said reaction time varies largely depending upon the reaction temperature used.

The benzene insoluble organoaluminum oxy-compound may also be prepared by direct contact of orranoaluminum with water. In the reaction mentioned above, water is used in such amount that the organoaluminum atom dissolved in the reaction system is less than 20%, based on total organoaluminum atom.

Water with which the organoaluminum compound is brought into contact may be used as solutions or dispersions in hydrocarbon solvents such as benzene, toluene and hexane, ether solvents such as tetrahydrofuran or amine solvents such as triethylamine, or may be used in the form of vapor or solid. The water with which the organoaluminum compound is brought into contact may be water of crystallization of salts such as magnesium chloride, magnesium chloride, magnesium sulfate, copper sulfate, nickel sulfate, iron sulfate and cerous chloride, or absorbed water absorbed to inorganic compounds such as silica, alumina and aluminum hydroxide or polymers.

Reaction of the organoaluminum compound with water is carried out usually in solvents, for example, hydrocarbon solvents. The solvents used in this case are aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclohexane; petroleum fractions such as gasoline, kerosene and gas oil; halogenated hydrocarbons such as halides of the above-mentioned aromatic hydrocarbons, aliphatic hydrocarbons and alicyclic hysrocarbons, particularly, chlorides and bromides; and ethers such as ethyl ether and tetrahydrofuran. Of these solvents as exemplified above, particularly preferred are aromatic hydrocarbons.

A concentration of organoaluminum compound in the reaction system in terms of aluminum atom is desirably $1 \times 10^{-3}$–5 gram atom/l, preferably $1 \times 10^{-2}$–3 gram atom/l, and a concentration of water in the reaction system is desirably $1 \times 10^{-3}$–5 mol/l, preferably $1 \times 10^{-2}$–3 mol/l.

In the reaction mentioned above, the organoaluminum atom dissloved in the reaction system is less than 20%, preferably less than 10%, more preferably 0 to 5% based on total organoaluminum atom.

The organoaluminum compound may be brought into contact with water, for example, by the following procedures.

(1) The procedure which comprises bringing the hydrocarbon solution of organoaluminum into contact with a hydrocarbon solvent containing water.

(2) The procedure which comprises blowing vapor of water into the hydrocarbon solution of organoaluminum, thereby bringing the organoaluminum into contact with the vapor.

(3) The procedure which comprises mixing the hydrocarbon solution of organoaluminum with a suspension of an absorbed water containing compound or a water of crystallization containing compound in hydrocarbon, thereby bringing the organoaluminum into contact with the absorbed water or water of crystallization.

(4) The procedure which comprises bringing the hydrocarbon solution of organoaluminum into contact directly with ice.

The hydrocarbon solution of organoaluminum may contain other components so long as they do not exert adverse effects on the reaction of organoaluminum with water.

The above-mentioned reaction of the organoaluminum with water is carried out usually at $-100°$ to $150°$ C., preferably $-70°$ to $100°$ C. and more desirably at $-50°$ to $80°$ C. The reaction time empolyed is usually 1 to 200 hours, preferably 2 to 100 hours, though said reaction time varies largely depending upon the reaction temperature used.

The first series of olefin polymerization catalysts according to the present invention is designed that the transition metal compound [B] containing a ligand having a cycloalkadienyl skeleton and, if necessary, the organoaluminum oxy-compound [C] are supported on the solid titanium catalyst component [A]. In order to support the transition metal compound [B] containing a ligand having a cycloalkadienyl skeleton and if necessary, the organoaluminum oxy-compound [C] on the solid titanium catalyst component [A], the following methods may be employed therefor.

(1) A method wherein the solid titanium catalyst component [A], the transition metal compound [B] containing a ligand having a cycloalkadienyl skeleton and, if necessary, the organoaluminum oxy-compound [C] are brought into contact with one another by mixing them together in a hydrocarbon solvent.

In carrying out this method, the above-mentioned components may be mixed together at once, or two of these components [A], [B] and, if necessary [C] may be first mixed together, followed by mixing with the remainder.

(2) A method wherein the hydrocarbon solvent is evaporated from the suspension obtained in the above method (1).

(3) The above-mentioned components [A], [B] and, if necessary, [C] are subjected to co-pulverization.

(4) In carrying out the method (3), a hydrocarbon or halogenated hydrocarbon solvent is allowed to coexist with the components to be co-pulverized.

Of the methods mentioned above, preferred are the methods (1) and (2), and the method (1) is particularly preferred. In carrying out the method (1), the concentrations of the components [A], [B] and [C] used, when they are mixed together, for example, in the hydrocarbon solvent, are such that the concentration of the component [A] is usually 0.1-200 mg atom-Ti/l, preferably 1-50 mg atom-Ti/l, that of the component [B] is usually 0.1-50 mmol/l, preferably 1-30 mmol/l, and that of the component [C] is usually not larger than 5000 mg atom-Al/l, preferably 1-5000 mg atom-Al/l and especially 5-1000 mg atom-Al/l. The reaction temperature employed is usually from $-50°$ to $100°$ C., preferably from $-20°$ C. to $50°$ C., and the time required for carrying out the reaction is usually 0.2-50 hours, preferably 0.5-20 hours, though it varies according to the reaction temperature employed.

In that case, it is desirable to support the transition metal compound [B] containing a ligand having a cycloalkadienyl skeleton on the solid titanium catalyst component [A] in such an amount that the atomic ratio of the transition metal to titanium (transition metal/titanium) becomes 0.02-10, preferably 0.05-5.

Similarly, it is desirable to support the organoaluminum oxy-compound [C] on the solid titanium catalyst component [A] in such an amount that the atomic ratio of the aluminum to transition metal (Al/transition metal) becomes not larger than 500, preferably 10-500 and especially 20-200.

In the first series of olefin polymerization catalysts according to the present invention, a solid catalyst component comprising the transition metal compound [B] containing a ligand having a cycloalkadienyl skeleton supported on the solid titanium catalyst component [A] has no olefin polymerization activities for itself but exhibits polymerization activities in the polymerization of olefins only when used in combination with the organoaluminum oxy-compound [II] and/or the organoaluminum compound [III].

Of the first series of olefin polymerization catalysts according to the invention, a solid catalyst comprising the transition metal compound [B] containing a ligand having a cycloalkadienyl skeleton and the organoaluminum oxy-compound [C], both having been supported on the solid titanium catalyst component [A] containing titanium, magnesium and halogen as its essential ingredients, has olefin polymerization activities and may be used, as it is, as an olefin polymerization catalyst.

Hereinafter, the second series of olefin polymerization catalysts according to the present invention is illustrated.

The olefin polymerization catalysts referred to herein comprise

[I] such a solid catalyst as mentioned above, and
[II] an organoaluminum oxy-compound and/or
[III] an organoaluminum compound.

The organoaluminum compound [III] used herein includes such organoaluminum compounds, for example, as represented by the formula $R^6_n AlX_{3-n}$ wherein $R^6$ is hydrocarbon of 1-12 carbon atoms, X is halogen or hydrogen, and n is 1-3.

In the above-mentioned formula, $R^6$ is hydrocarbon of 1-12 carbon atoms, for example, alkyl, cycloalkyl or aryl, including concretely methyl, ethyl, n-propyl, isopropyl, isobutyl, pentyl, hexyl, octyl, decyl, cyclopentyl, cyclohexyl, phenyl, tolyl, etc.

The above-mentioned organoaluminum Compounds will be exemplified below.

Trialkylaluminum such as trimethylaluminum, triethylaluminum, triisopropylaluminum, triisobutylaluminum, trihexylaluminum, trioctylaluminum, tri-2-ethylhexylaluminum, etc.

Alkenylaluminum such as isoprenylaluminum, etc.

Dialkylaluminum halides such as dimethylaluminum chloride, diethylaluminum chloride, diisopropylaluminum chloride, diisobutylaluminum chloride, dimethylaluminum bromide, etc.

Alkylaluminum sesquihalides such as methylaluminum sesquichloride, ethylaluminum sesquichloride, butylaluminum sesquichloride, ethylaluminum sesquibromide, etc.

Alkylaluminum dihalides such as methylaluminum dichloride, ethylaluminum dichloride, isopropylaluminum dichloride, ethylaluminum dibromide, etc.

Alkylaluminum hydrides such as diethylaluminum hydride, isobutylaluminum hydride, etc.

Furthermore, there may also be used other organoaluminum compounds represented by the formula $R^6_n AlY_{3-n}$ wherein $R^6$ is as defined previously, Y is $-OR^7$, $-OSiR^8_3$, $-OAlR^9_2$, $-NR^{10}_2$, $-SiR^{11}_3$ or

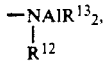

n is 1-2, $R^7$, $R^8$, $R^9$ and $R^{13}$ are each methyl, ethyl, isopropyl, isobutyl, cyclohexyl or phenyl, $R^{10}$ is hydrogen, methyl, ethyl, isopropyl, phenyl or trimethylsilyl, $R^{11}$ and $R^{12}$ are each methyl or ethyl.

The organoaluminum compounds as mentioned above include, in concrete, such compounds as enumerated below.

(i) Compounds of the formula $R^6_n Al(OR^7)_{3-n}$ such as dimethylaluminum methoxide, diethylaluminum ethoxide, diisobutylaluminum methoxide, etc.

(ii) Compounds of the formula $R^6_n Al(OSiR^8_3)_{3-n}$ such as $Et_2Al(OSiMe_3)$, $(iso-Bu)_2Al(OSiMe_3)$, $(iso-Bu)_2Al(OSiEt_3)$, etc.

(iii) Compounds of the formula $R^6_n Al(OAlR^9_2)_{3-n}$ such as $Et_2AlOAlEt_2$, $(iso-Bu)_2AlOAl(iso-Bu)_2$, etc.

(iv) Compounds of the formula $R^6_n Al(NR^{10}_2)_{3-n}$ such as $Me_2AlNEt_2$, $Et_2AlNHMe$, $Me_2AlNHEt$, $Et_2AlN(Me_3Si)_2$, $(iso-Bu)_2AlN(Me_3Si)_2$, etc.

(v) Compounds of the formula $R^6_n Al(SiR^{11}_3)_{3-n}$ such as $(iso-Bu)_2AlSiMe_3$, etc.

(vi) Compounds of the formula $R^6_n Al(NAlR^{13}_2)_{3-n}$ such as
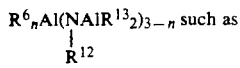

Of the organoaluminum compounds as exemplified above, preferred are those of the formula $R^6_3Al$, $R^6_n Al(OR^7)_{3-n}$ and $R^6Al(OAlR^9_2)_{3-n}$, particularly those in which $R^6$ is isoalkyl and n=2 are desirable. These organoaluminum compounds may be used in combination of two or more.

The organoaluminum oxy-compound [II] used herein includes the same organoaluminum oxy-compounds as used in preparing the above-mentioned solid catalyst [I].

In the present invention, olefin may be pre-polymerized on the above-mentioned olefin polymerization solid catalyst comprising the transition metal compound [B] containing a ligand having a cycloalkadienyl skeleton and the organoaluminum oxy-compound [C], both having been supported on the solid titanium catalyst component [A].

The above-mentioned pre-polymerization may be carried out by pre-polymerizing α-olefin on the olefin polymerization solid catalyst in an amount of 0.1-500 g, preferably 0.3-300 g and especially 1-100 g per 1 g of the olefin polymerization solid catalyst.

In carrying out pre-polymerization as mentioned above, the catalyst may be used in a concentration considerably higher than that of the catalyst used in the system of the main polymerization.

In the practice of the pre-polymerization, it is desirable to use the solid catalyst [I] in a concentration, based on 1 liter of the inert hydrocarbon medium, of usually about 0.01-200 mg atom-Ti/l, preferably about 0.1-100 mg atom-Ti/l and especially 1-50 mg atom-Ti/l. In this case, the organoaluminum oxy-compound [11] and/or the organoaluminum compound [III] may also be used in the system.

The pre-polymerization is preferably carried out by using a mixture of an inert hydrocarbon medium, the olefin and the above-mentioned catalyst components under mild conditions.

The inert hydrocarbon medium used herein includes aliphatic hydrocarbons such as propane, butane, pentane, hexane, heptane, octane, decane dodecane and kerosine; alyciclic hydrocarbons such as cyclopentane, cyclohexane and methylcyclopentane; aromatic hydrocarbons such as benzene, toluene and xylene; halogenated hydrocarbons such as ethylene chloride and chlorobenzene; or mixtures thereof. Further, the pre-polymerization may be carried out by using the olefin itself as a solvent, or may be carried out in a state substantially free from the solvent.

The olefin used in the pre-polymerization may be the same as used in the main polymerization as will be mentioned later or different therefrom. Of the olefins mentioned above, preferred is ethylene, in particular.

The pre-polymerization temperature employed is in the range usually from −20° C. to 100° C., preferably from −20° C. to 80° C., more preferably from 0° to 50° C.

In the pre-polymerization, a molecular weight modifier such as hydrogen may also be used. The molecular weight modifier mentioned above is desirably used in such an amount that an intrinsic viscosity [η], as measured in decalin at 135° C., of the resulting polymer from the pre-polymerization becomes higher than about 0.2 dl/g, preferably about 0.5-10 dl/g.

The pre-polymerization is desirably carried out so that the amount, based on 1 g of the above-mentioned solid catalyst, of the polymer formed is about 0.1–500 g, preferably about 0.3–300 g and especially 1–100 g. If the pre-polymerization amount of the olefin is excessive, the production efficiency of the desired olefin polymers sometimes decreases.

Furthermore, polymerization of olefins can be carried out in the present invention by using an olefin polymerization catalyst comprising the above-mentioned pre-polymerized catalyst, the organoaluminum oxy-compound [II] and/or the organoaluminum compound [III].

The first and second series of olefin polymerization catalysts according to the present invention as illustrated above include the following catalysts.

1) An olefin polymerization solid catalyst component comprising
   [A] a solid titanium catalyst component containing titanium, magnesium and halogen as its essential ingredients and having supported thereon
   [B] a transition metal compound containing a ligand having a cycloalkadienyl skeleton.
2) An olefin polymerization solid catalyst comprising
   [A] a solid titanium catalyst component containing titanium, magnesium and halogen as its essential ingredients and having supported thereon
   [B] a transition metal compound containing a ligand having a cycloalkadienyl skeleton, and
   [C] an organoaluminum oxy-compound.
3) An olefin polymerization catalyst comprising
   [I] a solid catalyst component comprising
      [A] a solid titanium catalyst component containing titanium, magnesium and halogen as its essential ingredient and having supported thereon
      [B] a transition metal compound containing a ligand having a cycloalkadienyl skeleton, and
   [II] an organoaluminum oxy-compound.
4) An olefin polymerization catalyst comprising
   [I] a solid catalyst component comprising
      [A] a solid titanium catalyst component containing titanium, magnesium and halogen as its essential ingredients and having supported thereon
      [B] a transition metal compound containing a ligand having a cycloalkadienyl skeleton,
   [II] an organoaluminum oxy-compound, and
   [III] an organoaluminum compound.
5) A pre-polymerized catalyst prepared by pre-polymerizing olefin on an olefin polymerization catalyst comprising
   [I] a solid catalyst component comprising
      [A] a solid titanium catalyst component containing titanium, magnesium and halogen as its essential ingredients and having supported thereon
      [B] a transition metal compound containing a ligand having a cycloalkadienyl skeleton, and
   [II] an organoaluminum oxy-compound.
6) A pre-polymerized catalyst prepared by pre-polymerizing olefin on an olefin polymerization catalyst comprising
   [I] a solid catalyst component comprising
      [A] a solid titanium catalyst component containing titanium, magnesium and halogen as its essential ingredients and having supported thereon
      [B] a transition metal compound containing a ligand having a cycloalkadienyl skeleton,
   [II] an organoaluminum oxy-compound, and
   [III] an organoaluminum compound.
7) An olefin polymerization catalyst comprising the above-mentioned pre-polymerized catalyst,
   [II] an organoaluminum oxy-compound, and/or
   [III] an organoaluminum compound.
8) An olefin polymerization catalyst comprising
   [I] a solid catalyst comprising
      [A] a solid titanium catalyst component containing titanium, magnesium and halogen as its essential ingredients and having supported thereon
      [B] a transition metal compound containing a ligand having a cycloalkadienyl skeleton, and
      [C] an organoaluminum oxy-compound, and
   [II] an organoaluminum oxy-compound.
9) An olefin polymerization catalyst comprising
   [I] a solid catalyst component comprising
      [A] a solid titanium catalyst component containing titanium, magnesium and halogen as its essential ingredients and having supported thereon
      [B] a transition metal compound containing a ligand having a cycloalkadienyl skeleton, and
      [C] an organoaluminum oxy-compound, and
   [II] an organoaluminum compound.
10) An olefin polymerization catalyst comprising
    [I] a solid catalyst comprising
       [A] a solid titanium catalyst component containing titanium, magnesium and halogen as its essential ingredients and having supported thereon
       [B] a transition metal compound containing a ligand having a cycloalkadienyl skeleton, and
       [C] an organoaluminum oxy-compound,
    [II] an organoaluminum oxy-compound, and
    [III] an organoaluminum compound.
11) A pre-polymerized catalyst prepared by pre-polymerizing olefin on [I] a solid catalyst comprising
    [A] a solid titanium catalyst component containing titanium, magnesium and halogen as its essential ingredients and having supported thereon
    [B] a transition metal compound containing a ligand having a cycloalkadienyl skeleton, and
    [C] an organoaluminum oxy-compound.
12) An olefin polymerization catalyst comprising
    [I] the above-mentioned pre-polymerized catalyst, and
    [III] an organoaluminum compound.
13) An olefin polymerization catalyst comprising
    [I] the above-mentioned pre-polymerized catalyst, and
    [II] an organoaluminum oxy-compound.
14) An olefin polymerization catalyst comprising
    [I] the above-mentioned pre-polymerized catalyst,
    [II] an organoaluminum oxy-compound, and
    [III] an organoaluminum compound.

The third series of olefin polymerization catalysts according to the present invention comprises
   [i] a solid containing a transition metal compound containing a ligand having a cycloalkadienyl skeleton and having supported thereon
   [ii] a titanium catalyst component containing titanium, magnesium and halogen as its essential ingredient and, if necessary,
   [iii] an organoaluminum oxy-compound.

The transition metal compound containing a ligand having a cycloalkadienyl skeleton used herein includes such compounds as mentioned previously.

The solid which will contain the transition metal compound as mentioned above includes particulate inorganic or organic carriers having an average particle diameter of usually 1–300 μm, preferably 10–200 μm.

The particulate inorganic carriers are preferably metallic oxides, for example, $SiO_2$, $Al_2O_3$, $MgO$, $ZrO_2$ and $TiO_2$ or mixtures thereof. Of these inorganic oxide carriers, preferred are those containing as their main component at least one member selected from the group consisting of $SiO_2$, $Al_2O_3$ and $MgO$. The inorganic oxide carriers before use are calcinated at a temperature of usually 150°-1000° C., preferably 200°-800° C. for 2-20 hours.

The particulate organic carriers include such particulate organic polymers of polyolefin, for example, polyethylene, polypropylene, poly-1-butene and poly-4-methyl-1-pentene.

In order to contain the transition metal compound containing a ligand having a cycloalkadienyl skeleton in the solid as mentioned above, it is preferable to use the following methods in the concrete.

(1) A method wherein the above-mentioned solid component and the transition metal compound are brought into contact with each other by mixing them together in a hydrocarbon solvent. In this case, it is preferable to use the transition metal compound after dissolving or suspending in the hydrocarbon solvent.

(2) A method wherein the hydrocarbon solvent is evaporated from the suspension obtained in the above method (1).

(3) A method according to the above method (1) wherein the solid component used is treated in advance with an organoaluminum compound, organoaluminum oxy-compound or halogenated silicon compound.

(4) A method according to above method (1) wherein the transition metal compound used is treated in advance with an organoaluminum compound or organoaluminum oxy-compound.

The amounts of the above-mentioned components used in preparing the solid [i] in which the transition metal compound is contained varies according to the method employed therefor and cannot be defined indiscriminately. However, the transition metal compound, for example, is used in an amount of about $5 \times 10^{-6} - 1 \times 10^{-2}$ mole, preferably $1 \times 10^{-5} - 5 \times 10^{-3}$ mole per 1 g of the solid component. In the solid [i] containing the transition metal compound thus obtained, it is desirable that said transition metal compound is contained in an amount of usually about $3 \times 10^{-6} - 3 \times 10^{-3}$ mole, preferably $5 \times 10^{-6} - 2 \times 10^{-3}$ mole and especially $1 \times 10^{-5} - 1 \times 10^{-3}$ mole per 1 g of the solid component.

The methods for the preparation of the solid [i] containing the transition metal compound are disclosed, for example, in Japanese Patent L-O-P Publns. Nos. 51405/1988, 51407/1988, 54403/1988, 61010/1988, 22804/1988, 89505/1988, 213504/1988 and 260903/1988.

In the third series of polymerization catalysts of the invention, the titanium catalyst component [ii] to be supported on the solid [i] containing a transition metal containing a ligand having a cycloalkadienyl skeleton is such a titanium catalyst component as mentioned previously.

Similarly, the aluminum oxy-compound [iii] to be supported on the solid containing the transition metal compound containing a ligand having a cycloalkadienyl skeleton is such an organoaluminum oxy-compound as mentioned previously.

The third series of olefin polymerization catalysts of the invention is designed that the solid component [i] containing the transition metal compound containing a ligand having a cycloalkadienyl skeleton is to support thereon the titanium catalyst component [ii] and the organoaluminum oxy-compound [iii]. In order to support the said titanium catalyst component [ii] and, if necessary, the said organoaluminum oxy-compound [iii], the following methods may be used therefor.

(1)
(i) A method wherein a liquid magnesium compound is allowed to react with an organoaluminum compound in the presence of the solid catalyst component [i] to deposit a magnesium aluminum composite on said solid catalyst component [i], followed by reaction with a titanium compound.

(ii) A method wherein a liquid magnesium compound, a liquid titanium compound and an organoaluminum compound are allowed to undergo reaction in the presence of the solid catalyst component [i] to deposit a magnesium aluminum titanium composite on said solid catalyst component [i].

(iii) A method wherein a liquid magnesium compound is allowed to react with a liquid titanium compound in the presence of the solid catalyst component [i] to deposit a magnesium titanium composite on said solid catalyst component [i].

(iv) A method wherein the solid component obtained in the above method (iii) is allowed further to react with a titanium compound.

(v) A method wherein the solid catalyst component [i] is allowed to react with a liquid titanium compound, followed by reaction with a liquid magnesium compound.

A method wherein the solid catalyst component obtained in the above methods (i)-(v) is brought into contact, if necessary, with the organoaluminum oxy-compound [iii] by mixing them together in a hydrocarbon solvent.

(2) A method wherein the hydrocarbon solvent is evaporated from the suspension obtained in the methods of (1).

(3) In the methods (i) and (ii), the organoaluminum oxy-compound [iii] is used in place of the organoaluminum compound.

The amount of the above-mentioned components used in preparing the solid catalyst component having supported the component [ii] and, if necessary, the component [iii] on the component [i] varies according to the method of preparation thereof as employed and cannot be defined indiscriminately. For example, based on 1 gram atom of the transition metal in the component [i], the magnesium compound is used in an amount of about 0.05-500 moles, preferably 0.1-200 moles, the titanium compound is used in an amount of about 0.02-100 moles, preferably 0.05-50 moles, and the component [iii] is used in an amount of up to 0-$10^7$ mg atom-Al, preferably about 4-$10^7$ gram atom-Al and especially 10-$10^6$ gram atom-Al.

The reaction temperature employed therein is usually from -50° C. to 150° C., preferably from -20° C. to 100° C., and the reaction temperature, though it varies according to the reaction temperature employed, is usually 0.2-100 hours, preferably 0.5-50 hours.

On the solid (I) containing the transition metal compound [i] containing a ligand having a cycloalkadinenyl skeleton, the supported titanium catalyst component [ii] desirably has the atomic ratio of the transition metal to titanium (transition metal/titanium) of 0.02-10, preferably 0.05-5, the atomic ratio of magnesium to titanium (Mg/Ti) of 1-100, preferably 2-50, and the atomic ratio of halogen to titanium (halogen/Ti) of 4-200, preferably 5-100.

Similarly, the supported organoaluminum oxy-compound [iii] desirably has the atomic ratio of aluminum to the above-mentioned transition metal (Al/transition metal) of 0-500, preferably 10-500 and especially 20-200.

Of the third series of olefin polymerization solid catalyst components according to the present invention as illustrated above, the solid catalyst component comprising the titanium catalyst component [ii] supported on a solid containing the transition metal compound [i] containing a ligand having a cycloalkadienyl skeleton does not have olefin polymerization activities for itself but exhibits the olefin polymerization activities only when it is used together with the organoaluminum oxy-compound (II) and/or the organoaluminum compound (III).

In contrast thereto, of the third series of olefin polymerization solid catalyst components according to the invention, the solid catalyst component comprising the titanium catalyst component [ii] and the organoaluminum oxy-compound [iii], both supported on the solid containing the transition metal compound [i] containing a ligand having a cycloalkadienyl skeleton has olefin polymerization activities for itself.

The fourth series of olefin polymerization catalysts according to the present invention comprises
(I) a solid catalyst component comprising
 [i] a solid containing a transition metal compound containing a ligand having a cycloalkadienyl skeleton and having supported thereon
 [ii] a titanium catalyst component containing titanium, magnesium and halogen as its essential ingredients and/or
 [iii] an organoaluminum oxy-compound,
(II) an organoaluminum oxy-compound and/or
(III) an organoaluminum compound.

The organoaluminum oxy-compound (II) and the organoaluminum compound (III) used respectively therein include those as mentioned [II] and [III] previously.

In the present invention, the olefin polymerization catalyst formed from a solid catalyst component comprising the titanium catalyst component [ii] and, if necessary, the organoaluminum oxy-compound [iii], both being supported on a solid containing the transition metal compound containing a ligand having a cycloalkadienyl skeleton may be pre-polymerized with olefin.

In practicing the pre-polymerization of the olefin polymerization catalyst, there can also be used the organoaluminum oxy-compound (II) and/or the organoaluminum compound (III) together with the above-mentioned solid catalyst component.

The above-mentioned pre-polymerization is carried out by pre-polymerizing the olefin polymerization catalyst with α-olefin in an amount of 0.1-500 g, preferably 0.3-300 g and especially 1-100 g per 1 g of the olefin polymerization catalyst.

In the pre-polymerization, there can be used the catalyst in a concentration considerably higher that of the catalyst used in the system of the main polymerization.

In the pre-polymerization to be carried out, it is desirable to use the solid catalyst component in a concentration, based on 1 liter of the inert hydrocarbon medium as will be mentioned later, of usually about 0.01-200 mg atom-Ti/l, preferably about 0.1-100 mg atom-Ti/l and especially 1-50 mg atom-Ti/l.

When the organoaluminum oxy-compound (II) is used in this pre-polymerization, it is preferable that said organoaluminum oxy-compound is used in such an amount that 0.1-500 g, preferably 0.3-300 g, pre 1 g of the solid catalyst component, of the polymer is formed, or in an amount, based on 1 gram atom of the transition metal in the solid catalyst component, of usually about 5-500 gram atom, preferably 10-200 gram atom and especially 20-100 gram atom.

When the organoaluminum compound (111) is used in the pre-polymerization, it is desirable that said organoaluminum compound is used in such an amount that 0.1-500 g, preferably 0.3-300 g, pre 1 g of the solid catalyst component, of the polymer is formed, or in an amount, based on 1 gram atom of titanium atom in the solid catalyst component, of usually about 0.1-100 gram atom, preferably about 0.5-50 gram atom and especially 1-20 gram atom.

An electron donor is used, if necessary, and it is desirable to use the electron donor, if any, in an amount, based on 1 gram atom of titanium atom in the solid component, of 0.1-50 moles, preferably 0.5-30 moles and especially 1-10 moles.

The pre-polymerization is desirably carried out using a mixture of an inert hydrocarbon medium, olefin and the above-mentioned catalyst components under mild conditions.

The inert hydrocarbon medium used therein includes those as mentioned previously.

Further, the pre-polymerization may be carried out by using the olefin itself as a solvent, or may be carried out in a state substantially free from the solvent.

The olefin used in the pre-polymerization may be the same as used in the main polymerization as will be mentioned later or different therefrom. Of the olefins mentioned above, preferred is ethylene, in particular.

The pre-polymerization temperature employed is in the range usually from −20° C. to 100° C., preferably from −20° C. to 80° C., more preferably from 0° to 50° C.

In the pre-polymerization, a molecular weight modifier such as hydrogen may also be used. The molecular weight modifier mentioned above is desirably used in such an amount that an intrinsic viscosity [η], as measured in decalin at 135° C., of the resulting polymer from the pre-polymerization becomes higher than about 0.2 dl/g, preferably about 0.5-10 dl/g.

The pre-polymerization is desirably carried out so that the amount, based on 1 g of the above-mentioned solid catalyst, of the polymer formed is about 0.1-500 g, preferably about 0.3-300 g and especially 1-100 g. If the pre-polymerization amount of the olefin is preset to become excessively large, the production efficiency of the desired olefin polymers sometimes decreases.

The third and fourth series of olefin polymerization solid catalysts of the present invention as illustrated above include such catalysts as enumerated below.
1) An olefin polymerization solid catalyst component comprising
 [i] a solid containing a transition metal compound containing a ligand having a cycloalkadienyl skeleton and having supported thereon
 [ii] a titanium catalyst component containing titanium, magnesium and halogen as its essential ingredients.

2) An olefin polymerization catalyst comprising
   (I) a solid catalyst component comprising
      [i] a solid containing a transition metal compound containing a ligand having a cycloalkadienyl skeleton and having supported thereon
      [ii] a titanium catalyst component containing titanium, magnesium and halogen as its essential ingredients, and
   (II) an organoaluminum oxy-compound.
3) An olefin polymerization catalyst comprising
   (I) a solid catalyst component comprising
      [i] a solid containing a transition metal compound containing a ligand having a cycloalkadienyl skeleton and having supported thereon
      [ii] a titanium catalyst component containing titanium, magnesium and halogen as its essential ingredients,
   (II) an organoaluminum oxy-compound, and
   (III) an organoaluminum compound.
4) A pre-polymerized catalyst prepared by pre-polymerizing olefin on an olefin polymerization catalyst comprising
   (I) a solid catalyst component comprising
      [i] a solid containing a transition metal compound containing a ligand having a cycloalkadienyl skeleton and having supported thereon
      [ii] a solid titanium catalyst component containing titanium, magnesium and halogen as its essential ingredients, and
   (II) an organoaluminum oxy-compound.
5) A pre-polymerized catalyst prepared by pre-polymerizing olefin on an olefin polymerization catalyst comprising
   (I) a solid catalyst component comprising
      [i] a solid containing a transition metal compound containing a ligand having a cycloalkadienyl skeleton and having supported thereon
      [ii] a titanium catalyst component containing titanium, magnesium and halogen as its essential ingredients,
   (II) an organoaluminum oxy-compound, and
   (III) an organoaluminum compound.
6) An olefin polymerization catalyst comprising
   (I) A pre-polymerized catalyst component as mentioned above, and
   (II) an organoaluminum oxy-compound.
7) An olefin polymerization catalyst comprising
   (I) A pre-polymerized catalyst component as mentioned above, and
   (III) an organoaluminum compound.
8) An olefin polymerization catalyst comprising
   (I) A pre-polymerized catalyst component as mentioned above,
   (II) an organoaluminum oxy-compound, and
   (III) an organoaluminum compound.
9) An olefin polymerization solid catalyst comprising
   [i] a solid containing a transition metal compound containing a ligand having a cycloalkadienyl skeleton and having supported thereon
   [ii] a titanium catalyst component containing titanium, magnesium and halogen as its essential ingredients, and
   [iii] an organoaluminum oxy-compound.
10) An olefin polymerization catalyst comprising
    (I) a solid catalyst component comprising
       [i] a solid containing a transition metal compound containing a ligand having a cycloalkadienyl skeleton and having supported thereon
       [ii] a titanium catalyst component containing titanium, magnesium and halogen as its essential ingredients, and
       [iii] an organoaluminum oxy-compound.
    (II) an organoaluminum oxy-compound.
11) An olefin polymerization catalyst comprising
    (I) a solid catalyst component comprising
       [i] a solid containing a transition metal compound containing a ligand having a cycloalkadienyl skeleton and having supported thereon
       [ii] a titanium catalyst component containing titanium, magnesium and halogen as its essential ingredients, and
       [iii] an organoaluminum oxy-compound, and
    (III) an organoaluminum compound.
12) An olefin polymerization catalyst comprising
    (I) a solid catalyst component comprising
       [i] a solid containing a transition metal compound containing a ligand having a cycloalkadienyl skeleton and having supported thereon
       [ii] a titanium catalyst component containing titanium, magnesium and halogen as its essential ingredients, and
       [iii] an organoaluminum oxy-compound,
    (II) an organoaluminum oxy-compound, and
    (III) an organoaluminum compound.
13) A pre-polymerized catalyst prepared by pre-polymerizing olefin on an olefin polymerization catalyst comprising
    (I) a solid catalyst component comprising
       [i] a solid containing a transition metal compound containing a ligand having a cycloalkadienyl skeleton and having supported thereon
       [ii] a solid titanium catalyst component containing titanium, magnesium and halogen as its essential ingredients, and
       [iii] an organoaluminum oxy-compound.
14) An olefin polymerization catalyst comprising
    (I) A pre-polymerized catalyst component as mentioned above, and
    (II) an organoaluminum oxy-compound.
15) An olefin polymerization catalyst comprising
    (I) A pre-polymerized catalyst component as mentioned above, and
    (III) an organoaluminum compound.
16) An olefin polymerization catalyst comprising
    (I) A pre-polymerized catalyst component as mentioned above,
    (II) an organoaluminum oxy-compound, and
    (III) an organoaluminum compound.

In the process for the polymerization of olefins according to the present invention, olefin polymers are obtained by polymerizing or copolymerizing olefins in the presence of the olefin polymerization solid catalyst as mentioned above.

Olefins which can be polymerized with the above-mentioned olefin polymerization catalysts include ethylene and α-olefins having 3 to 20 carbon atoms, for example propylene, 1-butene, 1-hexene, 4-methyl-1-pentene, 1-octene, 1-decene, 1-dodecene, 1-tetradecene, 1-hexadecene, 1-octadecene, 1-eicosene, cyclopentene, cycloheptene, norbornene, 5-methyl-2-norbornene, tetracyclododecene and 2-methyl-1,4,5,8-dimethano-1,2,3,4,4a,5,8,8a-octahydronaphthalene.

In addition to those exemplified above, there may also be used styrene, vinyl cyclohexane and diene, etc.

In the present invention, such olefins as exemplified above may be polymerized or copolymerized either by liquid phase polymerization such as solution or suspension polymerization or vapor phase polymerization.

The polymerization temperature employed in polymerizing the olefins with the above-mentioned olefin polymerization catalysts is in the range of usually from $-50°$ to $200°$ C., preferably from $0°$ to $150°$ C. The polymerization pressure employed is usually from atmospheric pressure to $100$ kg/cm$^2$, preferably from atmospheric pressure to $50$ kg/cm$^2$, and the polymerization reaction may be carried out by any of the batchwise, semi-continuous and continuous methods. Further, the polymerization may be carried out at two or more stages under different reaction conditions. The molecular weight of the olefin polymer resulting the polymerization may be modified by allowing hydrogen to exist in the polymerization system or by changing the polymerization temperature employed.

In carrying out polymerization of olefins by using the olefin polymerization catalysts as mentioned above, it is desirable to use the solid catalyst component in an amount, based on 1 liter of the reaction volume, of usually $1 \times 10^{-8} - 1 \times 10^{-3}$ gram atom-Ti/l, preferably $1 \times 10^{-7} - 1 \times 10^{-4}$ gram atom-Ti/l, and the transition metal compound containing a ligand having a cycloalkadienyl skeleton in an amount of usually $1 \times 10^{-8} - 1 \times 10^{-3}$ gram atom/l, preferably $1 \times 10^{-7} - 1 \times 10^{-4}$ gram atom/l.

Further, it is desirable to use the organoaluminum oxy-compound in a total amount of usually $1 \times 10^{-7} - 5 \times 10^{-3}$ gram atom-Al/l, preferably $1 \times 10^{-6} - 2 \times 10^{-3}$ gram atom-Al/l.

Furthermore, it is desirable to use the organoaluminum compound in a total amount of usually $5 \times 10^{-5} - 5 \times 10^{-2}$ mol/l, preferably $1 \times 10^{-4} - 1 \times 10^{-2}$ mol/l.

It is desirable that the aluminum/total transition metal (atomic ratio) is 10-5000, preferably 20-2000, and the ratio (Al atomic ratio) of the organoaluminum compound to the organoaluminum oxy-compound is 0.1-20, preferably 0.2-10.

In the present invention, the olefin polymerization catalysts may contain other useful components for olefin polymerization in addition to the above-mentioned components.

EFFECT OF THE INVENTION

The olefin polymerization catalysts of the present invention exhibit excellent polymerization activities when used in the polymerization of olefins and also are capable of giving olefin (co)polymers having a broad molecular weight distribution and excellent moldability.

The present invention is illustrated below with reference to examples, but it should be construed that the invention is in no way limited to those examples.

The molecular weight distribution ($\overline{Mw}/\overline{Mn}$) and composition distribution (amount of n-decane soluble portion) referred to in the examples of the invention were obtained by the following manner.

The value of $\overline{Mw}/\overline{Mn}$ is determined by the following procedure in accordance with Takeuchi, "Gel Permeation Chromatography", Maruzen, Tokyo.

(1) Using a standard polystyrene having a known molecular weight (mono-dispersed polystyrene produced by Toyo Soda Mfg. Co., Ltd.), a molecular weight M and its GPC (Gel Permeation Chromatograph) count are determined to prepare a correlation diagram calibration curve of the molecular weight and EV (evolution volume). At this time, the concentration is preset to 0.02% by weight.

(2) GPC chromatograph of a sample is prepared by GPC measurement, and a number average molecular weight $\overline{Mn}$ and a weight average molecular weight $\overline{Mw}$ in terms of polystyrene are calculated on the basis of the above-mentioned (1) to obtain a value of $\overline{Mw}/\overline{Mn}$. In that case, the conditions under which the sample is prepared and the GPC measurement is conducted are as in the following.

Preparation of Sample (a) The sample together with o-dichlorobenzene solvent are dispensed by Erlenmeyer flask so that the sample content becomes 0.1% by weight.
(b) The flask is heated to 140° C. and stirred for about 30 minutes to dissolve the sample in the solvent.
(c) The solution is filtered, and the filtrate is subjected to GPC.

GPC Measurement Conditions

The measurement was carried out under the following conditions.
(a) Equipment: 150C-ALC/GPC mfd. by Waters Co.
(b) Column: GMH Type mfd. by Toyo Soda Mfg. Co., Ltd.
(c) Amount of sample: 400$\mu$ liters
(d) Temperature: 140° C.
(e) Flow rate: 1 ml/min The measurement of the amount of n-decane-soluble portion (the smaller amount of soluble portion means the narrower composition distribution) was conducted by adding about 3 g of a copolymer of 450 ml of n-decane, dissolving the copolymer in n-decane at 145° C., followed by cooling to 23° C. Thereafter, the n-decane-insoluble portion was removed by filtration, and the n-decane-soluble portion was recovered from the filtrate, thereby measuring the amount of the n-decane-soluble portion.

Further, MFR of the copolymer was measured at 190° C. under a load of 2.16 kg.

EXAMPLE 1

Preparation of Titanium Catalyst Component [A]

A 400 ml glass flask charged with 5.1 g of commercially available anhydrous magnesium chloride and 194 ml of decane with stirring was added dropwise 18.8 ml of ethanol over a period of 10 minutes, followed by stirring at room temperature for 1 hour. Thereafter, 17.5 ml of diethylaluminum diluted with 20 ml of decane was added dropwise to the flask over a period of 1 hour, while maintaining the temperature within the system at 35°-40° C. After completion of the addition, the flask was further stirred at room temperature for 1 hour. Successively, 70.6 ml of titanium tetrachloride was added dropwise to the flask over a period of 30 minutes, and the flask was then heated to 80° C, followed by stirring at that temperature for 2 hours.

The reaction product obtained was filtered with a glass filter equipped with a jacket kept at 80° C. and was then washed several times with decane to obtain a solid titanium catalyst component comprising 4.8% by weight of titanium, 14% by weight of magnesium, 57% by weight of chlorine, 2.2% by weight of aluminum and 9.7% by weight of an ethoxy group.

Preparation of Solid Catalyst Component [I]

A 200 ml glass flask thoroughly purged with nitrogen was charged with 0.5 mg atom in terms of titanium atom of the catalyst component [A] as prepared above, 23.7 ml of toluene and 26.3 ml of a solution bis (methylcyclopentadienyl) zirconium dichloride in toluene (Zr=0.038 mol/l), followed by stirring at 80° C. for 2 hours. Thereafter, the toluene was removed therefrom by means of an evaporator under reduced pressure. The solids portion thus obtained was washed several times with toluene to obtain a solid catalyst component. The zirconium/titanium ratio (Zr/Ti) in this solid catalyst component was 0.38.

EXAMPLE 2

Preparation of Organoaluminum Oxy-Compound [II]

A 400 ml flask thoroughly purged with nitrogen was charged with 37.1 g of $Al_2(SO_4)_3 \cdot 14H_2O$ and 133 ml of toluene, cooled to −5° C., and 47.9 ml of trimethylaluminum diluted with 152 ml of toluene was added dropwise over a period of 1 hour, followed by reaction at a temperature of from 0° to −5° C. for 1 hour. The temperature of the flask was then elevated to 40° C. over a period of 3 hours, and the reaction was continued at that temperature for 72 hours. After completion of the reaction, the reaction mixture was subjected to solid-liquid separation by filtration, and the toluene was removed from the filtrate to obtain a white solid organoaluminum oxy-compound.

Polymerization

A 2-liter stainless steel autoclave thoroughly purged with nitrogen was charged with 600 ml of cyclohexane and 300 ml of 4-methyl-1-pentene, followed by rise in temperature of the system up to 70° C. Into the autoclave, 1 mg atom in terms of aluminum atom of the organoaluminum oxy-compound and $5 \times 10^{-4}$ mg atom in terms of titanium atom of the solid catalyst component [I] as prepared in Example 1 were injected together with ethylene to initiate polymerization. The polymerization was carried out at the total pressure of 8 kg/cm²-G and 80° C. for 40 minutes while continuously feeding ethylene to the polymerization system. As to the result, there was obtained 61.9 g of an ethylene/4-methyl-1-pentene copolymer having MFR of 0.44 g/10 min, a density of 0.914 g/cm³, an amount of decane-soluble portion of 0.82% by weight and $\overline{M}w/\overline{M}n$ of 10.9.

EXAMPLE 3

Preparation of Benzene-Insoluble Organoaluminum Oxy-Compound [II]

A 200 ml glass flask thoroughly purged with nitrogen was charged with 36.6 ml of a solution of the benzene-soluble organoaluminum oxy-compound as prepared in Example 2 in toluene (Al=2.73 mol/l), 1.69 g of particulate $Al_2(SO_4)_3 \cdot 14H_2O$ (passed through a 60-mesh screen) and 63.4 ml of toluene, and the contents of the flask were stirred at 80° C. for 7 hours, whereby a benzene-insoluble organoaluminum oxy-compound was obtained. The solubility in terms of weight in benzene at 60° C. of this compound was 0.3% by weight.

Polymerization

A 2-liter stainless steel autoclave thoroughly purged with nitrogen was charged with 600 ml of cyclohexane and 300 ml of 4-methyl-1-pentene, followed by rise in temperature of the system up to 70° C. Into the autoclave, 1 mmol of triisobutylaluminum, 0.1 mg atom in terms of aluminum atom of the benzene-insoluble organoaluminum oxy-compound and $1 \times 10^{-3}$ mg atom in terms of titanium atom of the solid catalyst component [I] as prepared in Example 1 were injected together with ethylene to initiate polymerization. The polymerization was carried out at the total pressure of 8 kg/cm²-G and 80° C. for 40 minutes while continuously feeding ethylene to the polymerization system. As the result, there was obtained 53.6 g of an ethylene/4-methyl-1-pentene copolymer having MFR of 0.09 g/10 min, a density of 0.905 g/cm³, an amount of decane-soluble portion of 0.31% by weight and $\overline{M}w/\overline{M}n$ of 6.8.

EXAMPLE 4

Preparation of Solid Titanium Catalyst Component [A]

A mixture of 4.8 g of commercially available anhydrous magnesium chloride, 23.1 ml of 2-ethylhexyl alcohol and 27 ml of decane was allowed to undergo reaction by heating for 3 hours at 140° C., whereby a homogeneous solution containing magnesium chloride was obtained. To this solution, 200 ml of decane was added and further, with stirring at 20° C., 52 ml of a solution of triethylaluminum in decane (Al=1.0 mol/l) was added dropwise over a period of 30 minutes, followed by reaction for 1 hour. Successively, the temperature of the reaction mixture was elevated to 80° C. over a period of 1 hour, and the reaction was continued further at that temperature for 1 hour. After completion of the reaction, 60 ml of a solution of diethylaluminum chloride in decane (Al= 1 mol/l) was added dropwise at 80° C. over a period of 30 minutes, followed by reaction for 1 hour. After completion of the reaction, a solids portion was separated by filtration. The solids portion thus obtained was suspended in 200 ml of decane, and thereto, 3.75 ml of a solution of 2-ethylhexoxytitanium trichloride in decane (Ti=1 mol/l) was added, followed by reaction at 80° C. for 1 hour. Filtration and washing of the reaction product gave a solid titanium catalyst component containing 1.3% by weight of titanium, 11% by weight of magnesium, 33% by weight of chloride, 2.4% by weight of aluminum and 45% by weight of a 2-ethylhexoxy group.

Preparation of Solid Catalyst Component [I]

A 200 ml glass flask thoroughly purged with nitrogen was charged with 1 mg atom in terms of titanium atom of the catalyst component [A] as prepared above, 34.2 ml of toluene and 65.8 ml of a solution of bis(methylcyclopentadienyl) zirconium dichloride in toluene (Zr=0.038 mol/l), followed by stirring at 80° C. for 2 hours. Thereafter, the toluene was removed therefrom under reduced pressure by means of an evaporator. The solids portion thus obtained was washed several times with toluene to obtain a solid catalyst component. In this solid catalyst component, the Zr/Ti atomic ratio was 0.55.

EXAMPLE 5

Pre-Polymerization

A 400 ml glass flask thoroughly purged with nitrogen was charged with 200 ml of hexane, 0.7 mg atom in terms of titanium atom of the solid catalyst component [I] as prepared in Example 4 and 48 mg atom in terms of aluminum atom of the organoaluminum oxy-compound as prepared in Example 1, and ethylene was continuously fed into the system to effect prepolymerization of ethylene at ordinary pressure and 30° C. for 5 hours. After completion of the pre-polymerization, the hexane was removed by decantation from the reaction mixture, and the residue was washed with hexane to obtain a pre-polymerized catalyst containing 15 g of polyethylene per 1 g of the solid catalyst component [I]. The Zr/Ti atomic ratio in this pre-polymerized catalyst was 0.46.

EXAMPLE 6

Pre-polymerization

A 400 ml glass flask thoroughly purged with nitrogen was charged with 200 ml of hexane, 0.7 mg atom in terms of titanium atom of the solid catalyst component [I] as prepared in Example 4, 5.8 mmole of triisobutylaluminum and 38.5 mg atom in terms of aluminum atom of the organoaluminum oxy-compound as prepared in Example 2, and ethylene was continuously fed into the system to effect pre-polymerization of ethylene at ordinary pressure and 30° C. for 5 hours. After completion of the pre-polymerization, the hexane was removed from the reaction mixture by decantation, and the residue was washed with hexane to obtain a pre-polymerized catalyst containing 13 g of polyethylene per 1 g of the solid catalyst component [I]. The Zr/Ti atomic ratio in this pre-polymerized catalyst was 0.43.

EXAMPLE 7

Polymerization

A 2-liter stainless steel autoclave thoroughly purged with nitrogen was charged with 150 g of sodium chloride (a special grade product of Wako Junyaku K.K.), followed by vacuum drying at 90° C. for 1 hour. The system was cooled down to 65° C., and thereto 0.5 mmole of triisobutyl aluminum and $1.5 \times 10^{-2}$ mg atom in terms of titanium atom of the prepolymerized catalyst as prepared in Example 5 were added. Into the autoclave, 0.5 liter of hydrogen and ethylene at 65° C. were introduced to initiate polymerization at the total pressure of 8 kg/cm$^2$-G. The polymerization was carried out at the total pressure of 8 kg/cm$^2$-G and 80° C. for 1 hour. After completion of the polymerization, the sodium chloride was removed therefrom by water washing, and the polymer remained was washed with methanol, followed by vacuum drying at 80° C. overnight. As the result, there was obtained 82.1 g of polyethylene having a bulking density of 0.39 g/cm$^3$ and MFR of not larger than 0.01 g/10 min.

EXAMPLE 8

Polymerization

A 2-liter stainless steel autoclave thoroughly purged with nitrogen was charged with 150 g of sodium chloride (a special grade product of Wako Junyaku K.K.), followed by vacuum drying at 90° C. for 1 hour. The system was cooled down to 65° C., and thereto $3 \times 10^{-2}$ mg atom in terms of titanium atom of the pre-polymerized catalyst as prepared in Example 6 were added. Into the autoclave, 0.5 liter of hydrogen and ethylene at 65° C. were introduced to initiate polymerization at the total pressure of 8 kg/cm$^2$-G. The polymerization was carried out at the total pressure of 8 kg/cm$^2$-G and 80° C. for 1 hour while feeding ethylene thereto. After completion of the polymerization, the sodium chloride was removed therefrom by water washing, and the polymer remained was washed with methanol, followed by vacuum drying at 80° C. overnight. As the result, there was obtained 191 g of polyethylene having a bulking density of 0.40 g/cm$^3$ and MFR of not larger than 0.01 g/10 min.

COMPARATIVE EXAMPLE 1

Polymerization

The polymerization of Example 2 was repeated except that no solid catalyst component [I] was used, but $1.5 \times 10^{-4}$ mmole of bis(methylcyclopentadienyl)zirconium dichloride was used, whereby 58.1 g of an ethylene/4-methyl-1-pentene copolymer having MFR of 1.60 g/10 min, a density of 0.912 g/cm$^3$, an amount of decane soluble at 23° C. of 0.20% by weight and $\overline{M}w/\overline{M}n$ of 3.6 was obtained.

COMPARATIVE EXAMPLE 2

Polymerization

The polymerization of Example 2 was repeated except that no solid titanium catalyst component [I] was used, but $2 \times 10^{-3}$ mg atom in terms of titanium atom of the titanium catalyst component [A] as prepared in Example 1 was used, and hydrogen was introduced into the system at a pressure of 2kg/cm$^2$, whereby 61.5 g of an ethylene/4-methyl-1-pentene copolymer having MFR of I.30 g/10 min, a density of 0.914 g/cm$^3$, an amount of decane-soluble at 23° C. of 11.9% by weight and $\overline{M}w/\overline{M}n$ of 7.3 was obtained.

EXAMPLE 9

Preparation of Solid Titanium Catalyst Component [A]

A 400 ml glass flask charged with 5.1 g of commercially available anhydrous magnesium chloride and 194 ml of decane with stirring was added dropwise 18.8 ml of ethanol over a period of 10 minutes, followed by stirring at room temperature for 1 hour. To the flask 17.5 ml of diethylaluminum chloride diluted with 20 ml of decane was added dropwise over a period of 1 hour, while maintaining the temperature of the system at 35°–40° C. After completion of the dropping, the flask was stirred at room temperature for 1 hour. Successively, 70.6 ml of titanium tetrachloride was added dropwise to the flask over a period of 30 minutes, followed by rise in temperature to 80° C. and stirring at that temperature for 2 hours.

The reaction product was filtered with a glass filter equipped with a jacket kept at 80° C. and then washed several times with decane to obtain a solid titanium catalyst component containing 4.8% by weight of titanium, 14% by weight of magnesium, 57% by weight of chlorine, 2.2% by weight of aluminum and 9.7% by weight of an ethoxy group.

Preparation of Benzene-Soluble Organoaluminum Oxy-Compound [C]

A 400 ml flask thoroughly purged with nitrogen was charged with 37.1 g of Al$_2$(SO$_4$)$_3$.14H$_2$O and 133 ml of toluene. The flask was cooled to $-5$° C., and charged with 47.9 ml of trimethylaluminum diluted with 152 ml of toluene by means of a dropping pipette over a period of 1 hour. Successively, the reaction was carried out at 0° to $-5$° C. for 1 hour, the temperature was elevated up to 40° C. over a period of 3 hours, and the reaction was continued at that temperature for 72 hours. After completion of the reaction, the reaction mixture was subjected to solid-liquid separation by filtration, and the toluene was removed from the filtrate to obtain a white solid organoaluminum oxy-compound.

Preparation of Solid Catalyst [I]

A 200 ml glass flask thoroughly purged with nitrogen was charged with 0.5 mg atom in terms of titanium atom of the catalyst component [A] as prepared above, 7.3 ml of a solution of the organoaluminum oxy-compound [C] in toluene (Al=2.73 mol/l), 10.5 ml of a solution of bis(methylcyclopentadienyl)zirconium dichloride in toluene (Zr=0.038 mol/l) and 32.2 ml of toluene, followed by stirring at 30° C. for 1 hour. Thereafter, the toluene was removed from the reaction mixture under reduced pressure by means of an evaporator. The solids portion thus obtained was washed several times with hexane to obtain a solid catalyst. In this solid catalyst, the Zr/Ti atomic ratio was 0.72.

EXAMPLE 10

Polymerization

A 2-liter stainless steel autoclave thoroughly purged with nitrogen was charged with 600 ml of cyclohexane and 300 ml of 4-methyl-1-pentene, followed by rise in temperature of the system up to 70° C. Into the autoclave, 1 mg atom in terms of aluminum atom of the organoaluminum oxy-compound and $2.0 \times 10^{-4}$ mg atom in terms of titanium atom of the solid catalyst component [1] as prepared in Example 9 were injected together with ethylene to initiate polymerization. The polymerization was carried out at the total pressure of 8 kg/cm$^2$-G and 80° C. for 40 minutes while continuously feeding ethylene to the polymerization system. As the result, there was obtained 52 0 g of an ethylene/4-methyl-1-pentene copolymer having MFR of 1.05 g/10 min, a density of 0.912 g/cm$^3$, an amount of decane-soluble portion of 0.69% by weight and $\overline{Mw}/\overline{Mn}$ of 4.5.

EXAMPLE 11

Polymerization

The polymerization of Example 10 was repeated except that in place of the organoaluminum oxy-compound, there were used 1 mmole of triisobutylaluminum and $1.4 \times 10^{-3}$ mg atom in terms of titanium atom of the solid catalyst component [I], whereby 46.6 g of an ethylene/4-methyl-1-pentene copolymer having MFR of 0.01 g/10 min, a density of 0.912 g/cm$^3$, an amount of decane-soluble portion of 0.10% by weight and $\overline{Mw}/\overline{Mn}$ of 13.6 was obtained.

EXAMPLE 12

Preparation of Benzene-Insoluble Organoaluminum Oxy-Compound [III]

A 200 ml glass flask thoroughly purged with nitrogen was charged with 36.6 ml of a solution of the benzene-soluble organoaluminum oxy-compound as prepared in Example 9, 1.69 g of particulate Al$_2$(SO$_4$)$_3$.14H$_2$O (passed through a 60-mesh screen) and 63.4 ml of toluene, and the flask was stirred at 80° C. for 7 hours to obtain a benzene-insoluble organoaluminum oxy-compound. The solubility of this compound in benzene kept at 60° C. in terms of the amount of the compound was 3% by weight.

Polymerization

The polymerization of Example 10 was repeated except that in place of the organoaluminum oxy-compound used therein, there were used 0.1 mg atom in terms of aluminum atom of the benzene-insoluble organoaluminum oxy-compound as prepared above, 1 mmole of triisobutylaluminum and $4.2 \times 10^{-4}$ mg atom in terms of titanium atom of the solid catalyst component [I], whereby 50.8 g of an ethylene/4-methyl-1-pentene copolymer having MFR of 0.13 g/10 min, a density of 0.904 g/cm$^3$, an amount of decane-soluble portion of 0.35% by weight and $\overline{Mw}/\overline{Mn}$ of 6.1 was obtained.

EXAMPLE 13

Preparation of solid titanium catalyst component [A]

A mixture of 4.8 g of commercially available anhydrous magnesium chloride, 23.1 ml of 2-ethylhexyl alcohol and 27 ml of decane was allowed to undergo reaction by heating for 3 hours at 140° C., whereby a homogeneous solution containing magnesium chloride was obtained. To this solution, 200 ml of decane was added and further, with stirring at 20° C., 52 ml of a solution of triethylaluminum in decane (Al=1.0 mol/l) was added dropwise over a period of 30 minutes, followed by reaction for 1 hour. Successively, the temperature of the reaction mixture was elevated to 80° C. over a period of 1 hour, and the reaction was continued further at that temperature for 1 hour. After completion of the reaction, 60 ml of a solution of diethylaluminum chloride in decane (Al=1 mol/l) was added dropwise at 80° C. over a period of 30 minutes, followed by reaction for 1 hour. After completion of the reaction, a solids portion was separated by filtration. The solids portion thus obtained was suspended in 200 ml of decane, and thereto, 3.75 ml of a solution of 2-ethylhexoxytitanium trichloride in decane (Ti=1 mol/l) was added, followed by reaction at 80° C. for 1 hour. Filtration and washing of the reaction product gave a solid titanium catalyst component containing 1.3% by weight of titanium, 11% by weight of magnesium, 33% by weight of chloride, 2.4% by weight of aluminum and 45% by weight of a 2-ethylhexoxy group.

Preparation of Solid Catalyst [I]

A 200 ml glass flask thoroughly purged with nitrogen was charged with 0.5 mg atom in terms of titanium atom of the catalyst component [A] as prepared above, 20.1 ml of a solution of the organoaluminum oxy-compound [C] in toluene (Al=2.73 mol/l), 28.9 ml of a solution bis (methylcyclopentadienyl) zirconium dichloride in toluene (Zr=0.038 mol/l) and 10 ml of toluene, followed by stirring at 30° C. for 1 hour. Thereafter, the toluene was removed under reduced pressure from the reaction mixture by means of an evaporator. The solids portion thus obtained was washed several times with hexane to obtain a solid catalyst component. In this solid catalyst, the Zr/Ti atomic ratio was 2.1.

EXAMPLE 14

Pre-polymerization

A 400 ml glass flask thoroughly purged with nitrogen was charged with 200 ml of hexane, 0.3 mg atom in terms of titanium atom of the solid catalyst [I] as prepared in Example 13 and 9.5 mmole of triisobutylaluminum, and pre-polymerization of ethylene was carried out at ordinary pressure and 30° C. for 5 hours while feeding ethylene to the system of the autoclave. After this pre-polymerization, the hexane was removed from the reaction mixture by decantation, and the residue was washed with hexane to obtain a pre-polymerized catalyst containing 29 g of polyethylene per 1 g of the solid catalyst component (I). The Zr/Ti atomic ratio in this pre-polymerized catalyst was 1.8.

EXAMPLE 15

Polymerization

A 2-liter stainless steel autoclave thoroughly purged with nitrogen was charged with 150 g of sodium chloride (a special grade product of Wako Junyaku K.K.), followed by vacuum drying at 90° C. for 1 hour. After cooling the system down to 65° C., the autoclave was charged with 0.7 mg atom in terms of aluminum atom of the benzene-soluble organoaluminum oxy-compound and $8 \times 10^{-3}$ mg atom in terms of titanium atom of the pre-polymerized catalyst as prepared in Example 14. Into the autoclave, 1.5 liters of hydrogen and then ethylene at 65° C. were introduced to initiate polymerization at the total pressure of 8 kg/cm²-G. The polymerization was carried out at the total pressure of 8 kg/cm²-G and 80° C. for 1 hour while feeding ethylene to the polymerization system. After completion of the polymerization, the sodium chloride was removed by water washing, and the polymer remained was washed with methanol, followed by vacuum drying at 80° C. overnight. As the result, there was obtained 76.5 g of polyethylene having a bulking density of 0.38 g/cm³, MFR of 0.05 g/10 min and $\overline{M}w/\overline{M}n$ of 5.7.

EXAMPLE 16

Polymerization

The polymerization of Example 15 was repeated except that in place of the ethylene, there were used a mixed gas of ethylene and 1-butene (containing 5.8 mol % of 1-butene), 0.6 mg atom in terms of aluminum atom of benzene-soluble organoaluminum oxy-compound, $1 \times 10^{-2}$ mg atom in terms of titanium atom of the pre-polymerized catalyst and 1.5 kg/cm² of hydrogen, and the polymerization was carried out for 40 minutes, whereby 92.3 g of an ethylene/1-butene copolymer having a bulking density of 0.37 g/cm³, MFR of 2.90 g/10 min, a density of 0.923 g/cm³, an amount of decane-soluble portion of 3.2% by weight and $\overline{M}w/\overline{M}n$ of 6.5 was obtained.

EXAMPLE 17

Preparation of zirconium catalyst component [i]

A 200 ml glass flask thoroughly purged with nitrogen was charged with 2.5 g of silica (average particle diameter 70 μm, specific surface area 260 m²/g, pore volume 1.65 cm³/g) which had been calcinated at 700° C. for 5 hours, 26 ml of a solution of dimethylaluminum monochloride in toluene (Al=1 mol/l) and 50 ml of toluene, followed by heating at 80° C. for 2 hours. Thereafter, a supernatant of the reaction mixture was removed by decantation, and the residue was washed with toluene. Thereafter the glass flask was then charged with 50 ml of toluene and 13 ml of a solution of bis(methylcyclopentadienyl)zirconium dichloride in toluene (Zr=0.04 mol/l), followed by heating at 80° C. for 1 hour. The toluene was then removed under reduced pressure by means of an evaporator to obtain a solid component. The solid component thus obtained was washed with toluene to obtain a zirconium catalyst component having supported thereon 9.0 mg of zirconium per 1 g of silica.

Preparation of solid catalyst component (I)

A 200 ml glass flask thoroughly purged with nitrogen was charged with 5 g of the zirconium catalyst component as prepared above, 3.2 ml of a solution of diethylaluminum monochloride in hexane (Al=1.0 mol/l) and 35 ml of hexane, and further charged at 25° C. with 1.5 ml of a hexane solution having the composition of MgCl₂.3(2-ethylhexyl alcohol).0.4TiCl₄ (Mg=1.0 mol/l). Thereafter, the temperature of the system was elevated to evaporate the hexane therefrom to obtain a solid catalyst component (I). The Zr/Ti atomic ratio in the solid catalyst component thus obtained was 0.82.

EXAMPLE 18

Preparation of Benzene-Soluble Organoaluminum Oxy-Compound (II)

A 400 ml flask thoroughly purged with nitrogen was charged with 37.1 g of Al₂(SO₄)₃.14H₂O and 133 ml of toluene, followed by cooling to $-5°$ C. The flask was then charged with 47.9 ml of trimethylaluminum diluted with 152 ml of toluene by means of a dropping pipette over a period of 1 hour, followed by reaction at a temperature of from 0° to $-5°$ C. for 1 hour. The temperature was then elevated to 40° C. over the period of 3 hours, and the reaction was continued at that temperature for 72 hours. After completion of the reaction, the reaction mixture was subjected to solid-liquid separation by filtration, and the toluene was removed from the filtrate to obtain a white solid benzene-soluble organoaluminum oxy-compound.

Polymerization

A 2-liter stainless steel autoclave thoroughly purged with nitrogen was charged with 600 ml of cyclohexane and 300 ml of 4-methyl-1-pentene, followed by rise in temperature of the system up to 70° C. Into the autoclave, 1 mg atom in terms of aluminum atom of the benzene-soluble organoaluminum oxy-compound and $7.5 \times 10^{-4}$ mg atom in terms of titanium atom of the solid catalyst component [I] as prepared in Example 17 were injected together with ethylene to initiate polymerization. The polymerization was carried out at the total pressure of 8 kg/cm²-G and 80° C. for 40 minutes. As the result, there was obtained 36.5 g of an ethylene/4-methyl-1-pentene copolymer having MFR of 2.50 g/10 min, a density of 0.919 g/cm³, an amount of decane-soluble portion of 1.5% by weight and $\overline{M}w/\overline{M}n$ of 4.5.

Preparation of Benzene-Insoluble Organoaluminum Oxy-Compound (II)

A 200 ml glass flask thoroughly purged with nitrogen was charged with 36.6 ml of a solution of the benzene-soluble organoaluminum oxy-compound as prepared in Example 18 in toluene (Al=2.73 mol/l), 1.69 g of Al₂(SO₄)₃.14H₂O (passed through a 60-mesh screen) and 63.4 ml of toluene, and stirred at 80° C. for 7 hours to obtain a benzene-insoluble organoaluminum oxy-compound. The solubility of the compound thus obtained in benzene kept at 60° C. in terms of the weight of the compound was 0.3% by weight.

Polymerization

The polymerization of Example 18 was repeated except that in place of the benzene-soluble organoaluminum oxy-compound, there were used 0.3 mg atom in terms of the aluminum atom of the benzene-insoluble organoaluminum oxy-compound as prepared above, 1 mmole of triisobutylaluminum and $1\times10^{-3}$ mg atom in terms of titanium atom of the solid catalyst component, whereby 30.2 g of an ethylene/4-methyl-1-pentene copolymer having MFR of 0.81 g/10 min, a density of 0.917 g/cm$^3$, an amount of decane soluble portion of 1.4% by weight and $\overline{M}w/\overline{M}n$ of 6.1 was obtained.

EXAMPLE 20

Preparation of solid catalyst component (I)

The preparation of the solid catalyst component (I) in Example 17 was repeated except that in place of the MgCl$_2$ 3(2-ethylhexyl alcohol).0.4 TiCl$_4$, there was used 2.0 ml of a hexane solution having the composition of MgCl$_2$ 3(2-ethylhexyl alcohol).0.2 TiCl$_4$ (Mg=1.0 mol/l), whereby a solid catalyst component (I) having the Zr/Ti atomic ratio of 1.2 was obtained.

EXAMPLE 21

Pre-polymerization

A 400 ml glass flask thoroughly purged with nitrogen was charged with 200 ml of hexane, 0.35 mg atom in terms of titanium atom of the solid catalyst component (I) as prepared in Example 20, 42 mg atom in terms of aluminum atom of the benzene-soluble organoaluminum oxy-compound as prepared in Example 18 and 6.3 mmoles of triisobutylaluminum, and pre-polymerization of ethylene was carried out at ordinary pressure and 30° C. for 5 hours while feeding ethylene to the system in the autoclave. After the pre-polymerization was over, the hexane was removed from the reaction mixture by decantation, and the residue was washed with hexane to obtain a pre-polymerized catalyst containing 9 g of polyethylene per 1 g of the solid catalyst component (I). The Zr/Ti atomic ratio in this pre-polymerized catalyst was 1.1.

EXAMPLE 22

Polymerization

A 2-liter stainless steel autoclave thoroughly purged with nitrogen was charged with 150 g of sodium chloride (a special grade product of Wako Junyaku K.K.), followed by vacuum drying at 90° C. for 1 hour and, after cooling the system down to 65° C., the autoclave was charged with $5\times10^{-2}$ mg atom in terms of titanium atom of the pre-polymerized catalyst as prepared in Example 21. Into the autoclave, 0.5 liter of hydrogen and ethylene at 65° C. were introduced to initiate polymerization at the total pressure of 8 kg/cm$^2$-G. The polymerization was carried out at the total pressure of 8 kg/cm$^2$-G and 80° C. for 1 hour while feeding ethylene to the system. After completion of the polymerization, the sodium chloride was removed from the reaction mixture by water washing, and the polymer remained was washed with methanol, followed by vacuum drying at 80° C. overnight. As the result, 62.2 g of polyethylene having a bulking density of 0.35 g/cm$^3$ and MFR of not larger than 0.01 g/10 min was obtained.

COMPARATIVE EXAMPLE 3

Polymerization

The polymerization of Example 18 was repeated except that no solid catalyst component (I) was used, but there was used $5\times10^{-4}$ μmole in terms of zirconium atom of the zirconium catalyst component [i] prepared in Example 17, whereby 60.5 g of an ethylene/4-methyl-1-pentene copolymer having MFR of 0.90 g/10 min, a density of 0.914 g/cm$^3$, an amount of decane-soluble portion at 23° C. of 0.72% by weight and $\overline{M}w/\overline{M}n$ of 3.3 was obtained.

EXAMPLE 23

Preparation of Zirconium Catalyst Component [i]

A 200 ml glass flask thoroughly purged with nitrogen was charged with 5.2 g of silica (average particle diameter 70 μm, specific surface area 260 m$^2$/g, pore volume 1.65 cm$^3$/g) which had been calcinated at 700° C. for 5 hours, 26 ml of a solution of dimethylaluminum monochloride in toluene (Al=1 mol/l) and 50 ml of toluene, followed by heating at 80° C. for 2 hours. Thereafter, a supernatant of the reaction mixture was removed by decantation, and the residue was washed with toluene. The flask was then charged with 50 ml of toluene and 13 ml of a solution of bis(methylcyclopentadienyl)zirconium dichloride in toluene (Zr=0.04 mol/l), followed by heating at 80° C. for 1 hour. Thereafter, the toluene was removed from the reaction mixture under reduced pressure by means of an evaporator to obtain a solid component. The solid component thus obtained was washed with toluene to obtain a zirconium catalyst component having supported thereon 9 0 mg of zirconium per 1 g of silica.

Preparation of Organoaluminum Oxy-Compound [iii]

A 400 ml flask thoroughly purged with nitrogen was charged with 37.1 g of Al$_2$(SO$_4$)$_3$.14H$_2$O and 133 ml of toluene and, after cooling to −5° C., the flask was charged with 47.9 ml of trimethylaluminum diluted with 152 ml of toluene by means of a dropping pipette over a period of 1 hour. The temperature of the flask was elevated up to 40° C. over a period of 3 hours, and the reaction was continued at that temperature for 72 hours. After the reaction was over, the reaction mixture was subjected to solid-liquid separation by filtration, and the toluene was removed from the filtrate to obtain a white solid organoaluminum oxy-compound.

Preparation of Solid Catalyst Component (I)

A 200 ml glass flask thoroughly purged with nitrogen was charged with 5 g of the zirconium catalyst component as prepared above, 3.2 ml of a solution of diethylaluminum monochloride in hexane (Al=1.0 mol/l) and 35 ml of hexane. To the flask, 1.5 ml of a hexane solution having the composition at room temperature of MgCl$_2$.3(2-ethylhexyl alcohol).0.4 TiCl$_4$ (Mg=1.0 mol/l) was then added, and the temperature of the system is elevated and the hexane was evaporated therefrom to obtain a solid component. Successively, the flask was charged with 13.6 ml of a solution of the organoaluminum oxy-compound as prepared above in toluene (Al=2.73 mol/l) and 20 ml of hexane, followed by stirring at room temperature for 30 minutes. The toluene and hexane were distilled off under reduced pressure by means of an evaporator to obtain a solid catalyst component (1).

In the solid catalyst component (I) thus obtained, the Zr/Ti atomic ratio was 0.82, and the Al/transition metal (Zr+Ti) atomic ratio was 37.

EXAMPLE 24

Polymerization

A 2-liter stainless steel autoclave thoroughly purged with nitrogen was charged with 600 ml of cyclohexane and 300 ml of 4-methyl-1-pentene, followed by rise in temperature to 70° C. Into the flask, 1 mmole of triisobutylaluminum and $5 \times 10^{-3}$ mg atom in terms of titanium atom of the solid catalyst component [1] as prepared in Example 23 were injected together with ethylene to initiate polymerization. The polymerization was carried out at the total pressure of 8 kg/cm$^2$-G and 80° C. for 40 minutes while continuously feeding ethylene to the polymerization system. As the result, there was obtained 45.9 g of an ethylene/4-methyl-1-pentene copolymer having MFR of 0.08 g/10 min, a density of 0.918 and $\overline{M}w/\overline{M}n$ of 12.0.

EXAMPLE 25

Preparation of Solid Catalyst Component (I)

The preparation of the solid catalyst component (I) in Example 23 was repeated except that in place of the MgCl$_2$.3(2-ethylhexyl alcohol).0.4TiCl$_4$, there was used 2.0 ml of a hexane solution having the composition of MgCl$_2$.3(2-ethylhexyl alcohol).0.2 TiCl$_4$, and the amount of the organoaluminum oxy-compound used was changed to 11.7 ml, whereby a solid catalyst component (I) having the Zr/Ti atomic ratio of 1.2 and the Al/total transition metal (Al/Zr+Ti) atomic ratio of 39.

EXAMPLE 26

Pre-polymerization

A 400 ml glass flask thoroughly purged with nitrogen was charged with 200 ml of hexane and 0.35 mg atom in terms of titanium atom of the solid catalyst component (I) as prepared in Example 25. Thereafter, pre-polymerization of ethylene was carried out at ordinary pressure and 30° C. for 5 hours while feeding ethylene to the system. After the pre-polymerization was over, the hexane was removed by decantation from the reaction mixture, and the residue was washed with hexane to obtain a pre-polymerized catalyst containing 8 g of polyethylene per 1 g of the solid catalyst component (I). In the pre-polymerized catalyst thus obtained, the Zr/Ti atomic ratio was 1.1.

EXAMPLE 27

Pre-polymerization

Example 26 was repeated except that 5.1 mmoles of triisobutylaluminum was used additionally, whereby a pre-polymerized catalyst containing 11 g of polyethylene per 1 g of the solid catalyst component [I] was obtained.

In the pre-polymerized catalyst, the Zr/Ti atomic ratio was 1.0.

Polymerization

A 2-liter stainless steel autoclave thoroughly purged with nitrogen was charged with 150 g of sodium chloride (a special grade product of Wako Junyaku K.K.), followed by vacuum drying at 90° C. for 1 hour. The temperature of the system was cooled down to 65° C., and the autoclave was charged with 1 mmole of triisobutylaluminum and $5 \times 10^{-2}$ mg atom in terms of titanium atom of the pre-polymerized catalyst as prepared in Example 26. Into the autoclave 0.5 liter of hydrogen and ethylene at 65° C. were introduced to initiate polymerization at the total pressure of 8 kg/cm$^2$-G. The polymerization was carried out at the total pressure of 8 kg/cm$^2$-G and 80° C. for 1 hour while feeding ethylene to the polymerization system. After completion of the polymerization, the sodium chloride was removed by water washing from the reaction mixture, and the polymer remained was washed with methanol, followed by vacuum drying at 80° C. overnight.

As the result, there was obtained 57.8 g of polyethylene having a bulking density of 0.35 g/cm$^3$ and MFR of not larger than 0.01 g/10 min.

EXAMPLE 29

Polymerization

The polymerization of Example 28 was repeated except that in place of the pre-polymerized catalyst as prepared in Example 26, there was used the pre-polymerized catalyst as prepared in Example 27 but using no triisobutylaluminum, whereby 50.4 g of polyethylene having a bulking density of 0.36 g/cm$^3$ and MFR of not larger than 0.01 g/10 min was obtained.

What is claimed is:

1. An olefin polymerization solid catalyst component comprising
    (A) a solid titanium catalyst component prepared by contacting titanium compound with halogen containing magnesium compound, and having supported thereon
    (B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal.

2. An olefin polymerization catalyst comprising
    (Ia) a solid catalyst component comprising
        (A) a solid titanium catalyst component prepared by contacting titanium compound with halogen containing magnesium compound, and having supported thereon
        (B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and
    (II) an aluminoxane.

3. An olefin polymerization catalyst comprising
(Ia) a solid catalyst comprising
  (A) a solid titanium catalyst component prepared by contacting titanium compound with halogen containing magnesium compound, and having supported thereon
  (B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and
(II) an aluminoxane, and
(III) an organoaluminum compound.

4. A pre-polymerization catalyst prepared by pre-polymerizing olefin on an olefin polymerization catalyst comprising
(Ia) a solid catalyst component comprising
  (A) a solid titanium catalyst component prepared by contacting titanium compound with halogen containing magnesium compound, and having supported thereon
  (B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and
(II) an aluminoxane.

5. A pre-polymerization catalyst prepared by pre-polymerizing olefin on an olefin polymerization catalyst comprising
(Ia) a solid catalyst component comprising
  (A) a solid titanium catalyst component prepared by contacting titanium compound with halogen containing magnesium compound, and having supported thereon
  (B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and
(II) an aluminoxane, and
(III) an organoaluminum compound.

6. An olefin polymerization catalyst comprising the pre-polymerized catalyst as described in claim 4 or claim 5, and further comprising at least one member selected from the group consisting of (II) aluminoxane and (III) an organoaluminum compound.

7. An olefin polymerization solid catalyst comprising
(A) a solid titanium catalyst component prepared by contacting titanium compound with halogen containing magnesium compound, and having supported thereon following (B) and (C);
(B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and
(C) an aluminoxane.

8. An olefin polymerization catalyst comprising
(Ib) a solid catalyst comprising
  (A) a solid titanium catalyst component prepared by contacting titanium compound with halogen containing magnesium compound, and having supported thereon following (B) and (C);
  (B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and
  (C) an aluminoxane, and
(II) an aluminoxane.

9. An olefin polymerization catalyst comprising
(Ib) a solid catalyst comprising
  (A) a solid titanium catalyst component prepared by contacting titanium compound with halogen containing magnesium compound, and having supported thereon following (B) and (C);
  (B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and (C) an aluminoxane, and (III) an organoaluminum compound.

10. An olefin polymerization catalyst comprising (Ib) a solid catalyst comprising (A) a solid titanium catalyst component prepared by contacting titanium compound with halogen containing magnesium compound, and having supported thereon following (B) and (C);

(B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and (C) an aluminoxane, (II) an aluminoxane, and (III) an organoaluminum compound.

11. A prepolymerized catalyst prepared by pre-polymerizing olefin on an olefin polymerization solid catalyst comprising (A) a solid titanium catalyst component prepared by contacting titanium compound with halogen containing magnesium compound, and having supported thereon following (B) and (C);

(B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and (C) an aluminoxane.

12. An olefin polymerization catalyst comprising (Ic) a pre-polymerized catalyst prepared by pre-polymerizing olefin on an olefin polymerization solid catalyst comprising (A) a solid titanium catalyst component prepared by contacting titanium compound with halogen containing magnesium compound, and having supported thereon following (B) and (C);

(B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and (C) an aluminoxane, (II) an aluminoxane.

13. An olefin polymerization catalyst comprising (Ic) a pre-polymerized catalyst prepared by pre-polymerizing olefin on an olefin polymerization solid catalyst comprising (A) a solid titanium catalyst component prepared by contacting titanium compound with halogen containing magnesium compound, and having supported thereon following (B) and (C);

(B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and (C) an aluminoxane, (III) an organoaluminum compound.

14. An olefin polymerization catalyst comprising (Ic) a pre-polymerized catalyst prepared by pre-polymerizing olefin on an olefin polymerization solid catalyst comprising (A) a solid titanium catalyst component prepared by contacting titanium compound with halogen containing magnesium compound, and having supported thereon following (B) and (C);

(B) a transition metal compound having formula MLx wherein M is a transition metal selected from the group consisting of zirconium, hafnium, chromium and vanadium, L is a ligand coordinating to the transition metal, at least one L is a ligand having a cycloalkadienyl skeleton, and when at least two or more ligands having a cycloalkadienyl skeleton are contained, at least two ligands having cycloalkadienyl skeleton may be linked together via lower alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, halogen or hydrogen, and x is a valence of the transition metal, and
(C) an aluminoxane,
(II) an aluminoxane, and
(III) an organoaluminum compound.

15. The olefin polymerization catalyst according to claim 1 in which:
(a) the atomic ratio of the transition metal to titanium is in the range of from 0.02 to 10;
(b) the atomic ratio of magnesium to titanium is in the range of from 1 to 100; and
(c) the atomic ratio of halogen to titanium is in the range of from 4 to 200.

16. The olefin polymerization catalyst according to any one of claims 2, 4, 8 or 12 in which
(a) the atomic ratio of the transition metal to titanium is in the range of from 0.02 to 10;
(b) the atomic ratio of magnesium to titanium is in the range of from 1 to 100; and
(c) the atomic ratio of halogen to titanium is in the range of from 4 to 200; and
(d) the atomic ratio of aluminum to the total transition metal is not greater than 5000.

17. The olefin polymerization catalyst according to any one of claims 7 or 11 in which
(a) the atomic ratio of the transition metal to titanium is in the range of from 0.02 to 10;
(b) the atomic ratio of magnesium to titanium is in the range of from 1 to 100; and
(c) the atomic ratio of halogen to titanium is in the range of from 4 to 200; and
(d) the atomic ratio of aluminum to the transition metal is not greater than 500.

18. The olefin polymerization catalyst according to any one of claims 3, 5, 9-10 or 13-14, in which:
(a) the atomic ratio of the transition metal to titanium is in the range of from 0.02 to 10;
(b) the atomic ratio of magnesium to titanium is in the range of from 1 to 100; and
(c) the atomic ratio of halogen to titanium is in the range of from 4 to 200; and
(d) the atomic ratio of aluminum to the total transition metal is not greater than 5000; and
(e) the ratio of the organoaluminum compound to aluminoxane is in the range of from 0.1 to 20; said ratio being calculated as Al (aluminum) atomic ratio.

19. The olefin polymerization catalyst according to claim 4 in which:
(a) the atomic ratio of the transition metal to titanium is in the range of from 0.02 to 10;
(b) the atomic ratio of magnesium to titanium is in the range of from 1 to 100; and
(c) the atomic ratio of halogen to titanium is in the range of from 4 to 200; and
(d) the atomic ratio of aluminum to the total transition metal is not greater than 5000.

20. The olefin polymerization catalyst according to claim 5 and further comprising at least one member selected from
(II) aluminoxane and
(III) an organoaluminum compound, and in which:
(a) the atomic ratio of the transition metal to titanium is in the range of from 0.02 to 10;
(b) the atomic ratio of magnesium to titanium is in the range of from 1 to 100; and
(c) the atomic ratio of halogen to titanium is in the range of from 4 to 200; and
(d) the atomic ratio of aluminum to the total transition metal is not greater than 5000; and
(e) the ratio of the organoaluminum compound to aluminoxane is in the range of from 0.1 to 20; said ratio being calculated as Al (aluminum) atomic ratio.

* * * * *